(12) United States Patent
Cheng et al.

(10) Patent No.: US 8,745,019 B2
(45) Date of Patent: Jun. 3, 2014

(54) ROBUST DISCOVERY OF ENTITY SYNONYMS USING QUERY LOGS

(75) Inventors: Tao Cheng, Redmond, WA (US); Kaushik Chakrabarti, Redmond, WA (US); Surajit Chaudhuri, Redmond, WA (US); Dong Xin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/487,260

(22) Filed: Jun. 4, 2012

(65) Prior Publication Data
US 2013/0232129 A1 Sep. 5, 2013

Related U.S. Application Data

(60) Provisional application No. 61/606,481, filed on Mar. 5, 2012.

(51) Int. Cl.
*G06F 17/30* (2006.01)

(52) U.S. Cl.
USPC ........... 707/705; 707/608; 707/687; 707/790; 707/813; 707/821

(58) Field of Classification Search
USPC .................. 707/608, 687, 705, 790, 813, 821
See application file for complete search history.

(56) References Cited

U.S. PATENT DOCUMENTS

| | | | |
|---|---|---|---|
| 5,297,039 A | 3/1994 | Kanaegami et al. | |
| 5,418,948 A | 5/1995 | Turtle | |
| 5,469,355 A | 11/1995 | Tsuzuki | |
| 5,717,913 A | 2/1998 | Driscoll | |
| 6,098,034 A | 8/2000 | Razin et al. | |
| 6,137,911 A | 10/2000 | Zhilyaev | |
| 6,269,368 B1 | 7/2001 | Diamond | |
| 6,363,377 B1 | 3/2002 | Kravets et al. | |
| 6,370,527 B1 | 4/2002 | Singhal | |
| 6,377,945 B1 | 4/2002 | Risvik | |
| 6,510,406 B1 | 1/2003 | Marchisio | |
| 6,675,159 B1 | 1/2004 | Lin et al. | |
| 6,804,677 B2 | 10/2004 | Shadmon et al. | |

(Continued)

OTHER PUBLICATIONS

Isard, et al., "Dryad: Distributed Data-Parallel Programs from Sequential Building Blocks," retrieved at <<http://research.microsoft.com/pubs/63785/eurosys07.pdf>>, EuroSys 2007, 2007, 14 pages.

(Continued)

*Primary Examiner* — Sana Al Hashemi
(74) *Attorney, Agent, or Firm* — Dan Choi; Carole Boelitz; Micky Minhas

(57) ABSTRACT

A similarity analysis framework is described herein which leverages two or more similarity analysis functions to generate synonyms for an entity reference string $r_e$. The functions are selected such that the synonyms that are generated by the framework satisfy a core set of synonym-related properties. The functions operate by leveraging query log data. One similarity analysis function takes into consideration the strength of similarity between a particular candidate string $s_e$ and an entity reference string $r_e$ even in the presence of sparse query log data, while another function takes into account the classes of $s_e$ and $r_e$. The framework also provides indexing mechanisms that expedite its computations. The framework also provides a reduction module for converting long entity reference strings into shorter strings, where each shorter string (if found) contains a subset of the terms in its longer counterpart.

20 Claims, 20 Drawing Sheets

(56) References Cited

U.S. PATENT DOCUMENTS

| | | |
|---|---|---|
| 7,080,068 B2 | 7/2006 | Leitermann |
| 7,254,774 B2 | 8/2007 | Cucerzan et al. |
| 7,293,003 B2 | 11/2007 | Horton |
| 7,296,011 B2 | 11/2007 | Chaudhuri et al. |
| 7,330,811 B2 | 2/2008 | Turcato et al. |
| 7,440,941 B1 | 10/2008 | Borkovsky et al. |
| 7,483,829 B2 | 1/2009 | Murakami et al. |
| 7,526,425 B2 | 4/2009 | Marchisio et al. |
| 7,552,112 B2 | 6/2009 | Jhala et al. |
| 7,627,548 B2 | 12/2009 | Riley et al. |
| 7,634,462 B2 | 12/2009 | Weyand et al. |
| 7,636,714 B1 | 12/2009 | Lamping et al. |
| 7,707,047 B2 | 4/2010 | Hasan et al. |
| 7,778,817 B1 | 8/2010 | Liu et al. |
| 7,860,853 B2 | 12/2010 | Ren et al. |
| 7,890,521 B1 | 2/2011 | Grushetskyy et al. |
| 2002/0169755 A1 | 11/2002 | Framroze et al. |
| 2003/0004716 A1 | 1/2003 | Haigh et al. |
| 2003/0195877 A1 | 10/2003 | Ford et al. |
| 2005/0060312 A1 | 3/2005 | Curtiss et al. |
| 2005/0060337 A1 | 3/2005 | Chou et al. |
| 2005/0060643 A1 | 3/2005 | Glass et al. |
| 2005/0080613 A1 | 4/2005 | Colledge et al. |
| 2005/0086592 A1 | 4/2005 | Polanyi et al. |
| 2005/0149494 A1 | 7/2005 | Lindh et al. |
| 2005/0216443 A1 | 9/2005 | Morton et al. |
| 2006/0031207 A1 | 2/2006 | Bjarnestam et al. |
| 2006/0069589 A1 | 3/2006 | Nigam et al. |
| 2006/0089927 A1 | 4/2006 | Bandyopadhyay et al. |
| 2006/0195421 A1 | 8/2006 | Kilroy |
| 2006/0206306 A1 | 9/2006 | Cao et al. |
| 2006/0218136 A1 | 9/2006 | Surakka et al. |
| 2006/0253427 A1 | 11/2006 | Wu et al. |
| 2007/0011154 A1 | 1/2007 | Musgrove et al. |
| 2007/0043723 A1 | 2/2007 | Bitan et al. |
| 2007/0073745 A1 | 3/2007 | Scott et al. |
| 2007/0100823 A1 | 5/2007 | Inmon |
| 2007/0192085 A1 | 8/2007 | Roulland et al. |
| 2007/0239742 A1 | 10/2007 | Saha et al. |
| 2008/0016040 A1 | 1/2008 | Jones et al. |
| 2008/0021898 A1 | 1/2008 | Hoglund |
| 2008/0077570 A1* | 3/2008 | Tang et al. ............ 707/5 |
| 2008/0087725 A1 | 4/2008 | Liu |
| 2008/0091660 A1 | 4/2008 | Jang et al. |
| 2008/0147618 A1 | 6/2008 | Bauche |
| 2008/0154873 A1 | 6/2008 | Redlich et al. |
| 2008/0275837 A1 | 11/2008 | Lambov |
| 2009/0144609 A1 | 6/2009 | Liang et al. |
| 2009/0319500 A1 | 12/2009 | Agrawal et al. |
| 2009/0327223 A1 | 12/2009 | Chakrabarti et al. |
| 2010/0082657 A1 | 4/2010 | Paparizos et al. |
| 2010/0293179 A1 | 11/2010 | Chaudhuri et al. |
| 2010/0313258 A1 | 12/2010 | Chaudhuri et al. |
| 2011/0125776 A1 | 5/2011 | Roshen et al. |
| 2011/0213796 A1* | 9/2011 | Kiyota et al. ............ 707/769 |
| 2011/0282856 A1 | 11/2011 | Ganti et al. |
| 2012/0117078 A1 | 5/2012 | Morton et al. |

OTHER PUBLICATIONS

Jones, et al., "Generating Query Substitutions," retrieved at <<http://acm.org>>, Proceedings of the 15th International Conference on World Wide Web, 2006, pp. 387-396.

Mei, et al., "Query Suggestion Using Hitting Time," retrieved at <<http://ACM.org>>, Proceedings of the 17th ACM Conference on Information and Knowledge Management, Oct. 2008, pp. 469-477.

Navarro, Gonzalo, "A Guided Tour to Approximate String Matching," retrieved at <<http://ACM.org>>, ACM Computing Surveys, vol. 33, Issue 1, Mar. 2001, pp. 31-88.

Guo, et al., "Named Entity Recognition in Query," retrieved at <<http://acm.org>>, Proceedings of the 32nd International ACM SIGIR Conference on Research and Development in Information Retrieval, Jul. 2009, pp. 267-274.

Pantel, et al., "Web-Scale Distributional Similarity and Entity Set Expansion," retrieved at <<http://www.aclweb.org/anthology/D/D09/D09-1098.pdf>>, Proceedings of the 2009 Conference on Empirical Methods in Natural Language Processing, Aug. 2009, pp. 938-947.

Sarkas, et al., "Structured Annotations of Web Queries," retrieved at <<http://acm.org>>, Proceedings of the 2010 International Conference on Management of Data, Jun. 2010, pp. 771-782.

Cheng, et al., "Fuzzy Matching of Web Queries to Structured Data," retrieved at <<http://ieeexplore.ieee.org>>, 2010 IEEE 26th International Conference on Data Engineering (ICDE), Mar. 2010, pp. 713-716.

"Foundations of Statistical Natural Language Processing," retrieved at <<http://nlp.stanford.edu/fsnlp/>>, retrieved on Jul. 4, 2012, companion website to the book: Foundations of Statistical Natural Language Processing, Manning, et al., MIT Press, Jun. 18, 1999, 2 pages.

Agrawal, "Mining Association Rules Between Sets of Items in Large Databases," retrieved at <<http://rakesh.agrawal-family.com/papers/sigmod93assoc.pdf>>, Proceedings of the 1993 ACM SIGMOD International Conference on Management of Data, May 1993, 10 pages.

Aho, et al., "Efficient String Matching: An Aid to Bibliographic Search," retrieved at <<http://www.win.tue.nl/~watson/2R080/opdracht/p333-aho-corasick.pdf>>, Communications of the ACM CACM, vol. 18, Issue 6, Jun. 1975, pp. 333-340.

Arasu, et al., "Efficient Exact Set-Similarity Joins," retrieved at <<http://www.vldb.org/conf/2006/p918-arasu.pdf>>, Proceedings of the 32nd International Conference on Very Large Data Bases, Sep. 2006, pp. 918-929.

Argawal, et al., "Scalable Ad-hoc Entity Extraction from Text Collections," retrieved at <<http://www.cs.uwaterloo.ca/~ilyas/CS848F08/papers/agrawal2008.pdf>>, Proceedings of the VLDB Endowment VLDB Endowment, vol., Issue 1, Aug. 2008 pp. 945-957.

Bohn, Christian, "Extracting Named Entities and Synonyms from Wikipedia for use in News Search," retrieved at <<http://daim.idi.ntnu.no/masteroppgaver/IME/IDI/2008/4290/masteroppgave.pdf>>, Master of Science in Computer Science, Norwegian University of Science and Technology, Department of Computer and Information Science, Jun. 2008, 95 pages.

Chakrabarti, et al., "An Efficient Filter for Approximate Membership Checking," retrieved at <<http://acm.org>>, Proceedings of the 2008 ACM SIGMOD International Conference on Management of Data, Jun. 2008, pp. 805-817.

Chaudhuri, et al., "A Primitive Operator for Similarity Joins in Data Cleaning," retrieved at <<http://ieeexplore.ieee.org/stamp/stamp.jsp?arnumber=1617373&isnumber=33902>>, Proceedings of the 22nd International Conference on Data Engineering (ICDE 2006), 2006, 12 pages.

Cheng, et la., "EntityRank: Searching Entities Directly and Holistically," retrieved at <<http://www-forward.cs.uiuc.edu/pubs/2007/entityrank-vldb07-cyc-jul07.pdf>>, Proceedings of the 33rd International Conference on Very Large Data Bases, Sep. 2007, 12 pages.

Cohen, et al., "Exploiting Dictionaries in Named Entity Extraction: Combining Semi-Markov Extraction Processes and Data Integration Methods," retrieved on at <<http://www.cs.cmu.edu/~wcohen/postscript/kdd-04-csmm.pdf>>, Proceedings of the Tenth ACM SIGKDD International Conference on Knowledge Discovery and Data mining, Aug. 2004, 10 pages.

Dong, et al., "Reference Reconciliation in Complex Information Spaces," retrieved at <<http://db.cs.washington.edu/semex/reconciliation_sigmod.pdf>>, Proceedings of the 2005 ACM SIGMOD International Conference on Management of Data, 2005, 12 pages.

Ganti, et al., "Entity Catergorization Over Large Document Collections," retrieved at <21 http:// acm.org>>, Proceedings of the 14th ACM SIGKDD International Conference on Knowledge Discovery and Data Mining, Aug. 2008, pp. 274-282.

Gligorov, et al., "Using Google Distance to Weight Approximate Ontology Matches," retrieved at <<http://www.cs.vu.nl/~frankh/postscript/BNAIC07-WWW07.pdf>>, Proceedings of the 16th International Conference on World Wide Web, 2007, 2 pages.

Han, et al., "Data Mining: Concepts and Techniques," retrieved on at <<http://www.ir.iit.edu/~dagr/DataMiningCourse/Spring2001/BookNotes/4lang.pdf>>, slide presentation, Intelligent Database

(56) References Cited

OTHER PUBLICATIONS

Systems Research Lab, School of Computing Science, Simon Fraser University, Canada, Jun. 17, 2001, 5 pages.
Hu, Wen-Chu, "ApproxSeek: Web Document Search Using Approximate Matching," retrieved at http://citeseerx.ist.psu.edu/viewdoc/download;jsessionid=F776964F00B448D5445A84C3528F0E83?doi=10.1.1.44.8602&rep=rep1&type=pdf>>, Proceedings of the Fifth International Conference on Computer Science and Informatics, Sep. 1999, 5 pages.
Koudas, et al., "Record Linkage: Similarity Measures and Algorithms," retrieved at http://disi.unitn.it/~p2p/RelatedWork/Matching/aj__recordLinkage__06.pdf>>, presentation dated Sep. 23, 2006, 130 pages.
Smeaton, et al., "Experiments on Incorporating Syntactic Processing of User Queries into a Document Retrieval Strategy," retrieved at <<http://acm.org>>, Proceedings of the 11th Annual International ACM SIGIR Conference on Research and Development in Information Retrieval, 1988, pp. 31-51.
Graupmann, Jens, "Concept-Based Search on Semi-Structured Data Exploiting Mined Semantic Relations," accessed at <<http://www.springerlink.com/content/p7fw8dk70v2x8w4a/fulltext.pdf>>, EDBT 2004 Workshops, LNCS 3268, Eds. W. Lindner, et al., Springer-Verlag, Berlin Heidelberg, 2004, pp. 34-43.
Cohen, et al., "XSEarch: A Semantic Search Engine for XML," accessed at <<http://www.vldb.org/conf/2003/papers/S03P02.pdf, Proceedings of the 29th VLDB Conference, 2003, 12 pages.
Chklovski, et al., "VERBOCEAN: Mining the Web for Fine-Grained Semantic Verb Relations," accessed at <<http://acl.ldc.upenn.edu/acl2004/emnlp/pdf/Chklovski.pdf>>, Proceedings of EMNLP 2004, 2004, 8 pages.
Chang, et al., "Structured Databases on the Web: Observations and Implications," accessed at <<http://eagle.cs.uiuc.edu/pubs/2004/dwsurvey-sigmodrecord-chlpz-aug04.pdf>>, ACM SIGMOD Record Archive, vol. 33, Issue 3, 2004, 10 pages.
Craswell, et al., "Random Walks on the Click Graph," accessed at <<http://research.microsoft.com/users/nickcr/pubs/craswell__sigir07.pdf>>, Proceedings of the 30th Annual International ACM SIGIR Conference on Research and Development in Information Retrieval, 2007, 8 pages.
Fuxman, et al., "Using the Wisdom of the Crowds for Keyword Generation," accessed at <<http://acm.org>>, Proceedings of the 17th International Conference on World Wide Web, 2008, pp. 61-70.
Malekian, et al., "Optimizing Query Rewrites for Keyword-Based Advertising," accessed at <<http://acm.org>>, Proceedings of the 9th ACM Conference on Electronic Commerce, Jul. 2008, pp. 10-19.
Miller, George A., "Wordnet: A Lexical Database for English," accessed at <<http://acm.org>>, Communications of the ACM, vol. 38, No. 11, Nov. 1995, pp. 39-41.
Strube, et al., "Wikirelate! Computing Semantic Relatedness Using Wikipedia," accessed at <<http://www.dit.unitn.it/~p2p/RelatedWork/Matching/aaai06.pdf>>, AAAI'06, Proceedings of the 21st National Conference on Artificial intelligence, 2006, 6 pages.
Turney, Peter D., accessed at >>http://cogprints.org/1796/1/ECML2001.ps>>, "Mining the Web for Synonyms: PMI-IR versus LSA on TOEFL," EMCL'01, Proceedings of the 12th European Conference on Machine Learning, LNCS, vol. 2167, 2001, 12 pages.
Wen, et al., "Clustering User Queries of a Search Engine," accessed at <<http://research.microsoft.com/users/jrwen/jrwen__files/publications/QC-WWW10.pdf>>, Proceedings of the 10th International Conference on World Wide Web, 2001, pp. 162-168.
Zhai, et al., "A Study of Smoothing Methods for Language Models Applied to Ad Hoc Information Retrieval," accessed at <<http://acm.org>>, Proceedings of the 24th Annual International ACM SIGIR Conference on Research and Development in Information Retrieval, 2001, 9 pages.
"Enterprise software," retrieved at <<http://en.wikipedia.org/wiki/Enterprise_software>>, retrieved on Jun. 19, 2012, Wikipedia article, 3 pages.
Ganjam, et al., U.S. Appl. No. 13/413,179, "Entity Augmentation Service from Latent Relational Data," filed Mar. 6, 2012, 54 pages.
Distributional hypothesis, retrieved at <<http://en.wikipedia.org/wiki/Distributional_hypothesis>>, retrieved on Mar. 1, 2011, Wikipedia online encyclopedia excerpt, 2 pages.
Cheng, et al., U.S. Appl. No. 13/527,601, "Data Services for Enterprises Leveraging Search System Data Assets," filed on Jun. 20, 2012, 58 pages.
Yakout, et al., "InfoGather: Entity Augmentation and Attribute Discovery by Holistic Matching with Web Tables," retrieved at <<http://acm.org>>, Proceedings of the 2012 International Conference on Management of Data, May 2012, pp. 97-108.
Pasca, Marius, "Weakly-Supervised Discovery of Named Entities Using Web Search Queries," retrieved at <<http://www.acm.org>>, Proceedings of the Sixteenth ACM Conference on Conference on Information and Knowledge Management, Nov. 2007, pp. 683-690.
Kim, et al., "A comparison of collocation-based similarity measures in query expansion," Information Processing and Management, No. 35, 1999, pp. 19-30.
Schenkel, et al., "Efficient Top-k Querying over Social-Tagging Networks," retrieved at <<http://acm.org>>, Proceedings of the 31st Annual International ACM SIGIR Conference on Research and Development in Information Retrieval, Jul. 2008, 8 pages.
Tsoukalas, et al., "PLEDS: A Personalized Entity Detection System Based on Web Log Mining Techniques," retrieved at <<http://www2.fas.sfu.ca/pub/cs/techreports/2008/CMPT2008-06.pdf>>, WAIM, Proceedings of the Ninth International Conference on Web-Age Information Management, Jul. 2008, pp. 1-23.
Peters, et al., "Folksonomy and Information Retrieval," retrieved at <<http://wwwalt.phil-fak.uni-duesseldorf.de/infowiss/admin/public__dateien/files/1/1194344432asist__am07.pdf>>, Proceedings of the 70th ASIS&T Annual Meeting, vol. 44, 2007, 33 pages.
Chirita, et al., "PTAG: Large Scale Automatic Generation of Personalized Annotation TAGs for the Web," retrieved at <<http://acm.org>>, Proceedings of the 16th International Conference on World Wide Web, May 2007, pp. 845-854.
Chaudhuri, et al., "Exploiting Web Search to Generate Synonyms for Entities," retrieved at <<http://www2009.org/proceedings/pdf/p151.pdf>>, Proceedings of the 18th International Conference on World Wide Web, Apr. 2009, pp. 151-160.
Chaudhuri, et al., "Mining Document Collections to Facilitate Accurate Approximate Entity Matching," retrieved at <<http://www.vldb.org/pvldb/2/vldb09-315.pdf>>, Proceedings of the VLDB Endowment, vol. 2, No. 1, Aug. 2009, 12 page.
Agrawal, et al., "Exploiting web search engines to search structured databases," retrieved at <<http://acm.org>>, Proceedings of the 18th International Conference on World Wide Web, Apr. 2009, pp. 501-510.
Agrawal, et al., "Scalable Ad-hoc Entity Extraction from Text Collections," retrieved at <<http://www.acm.org>>, Proceedings of the VLDB Endowment VLDB Endowment, vol. 1, Issue 1, Aug. 2008, pp. 945-957.
Baroni, et al., "Using cooccurrence statistics and the web to discover synonyms in a technical language," retrieved at <<http://clic.cimec.unitn.it/marco/publications/lrec2004/syn__lrec__2004.pdf>>, Proceedings of the LREC 2004, 2004, 4 pages.
Dong, et al., "Reference Reconciliation in Complex Information Spaces," retrieved at <<http://acm.org>>, Proceedings of the 2005 ACM SIGMOD International Conference on Management of Data, 2005, pp. 85-96.
"Microsoft Research TechFest 2012: Projects," retrieved at http://research.microsoft.com/en-us/events/techfest2012/projects.aspx>>, retrieved on Apr. 10, 2012, Microsoft Corporation, Redmond, WA, 7 pages.
Cheng, et al., "Entity Synonyms for Structured Web Search," retrieved at <<http://ieeexplore.ieee.org/stamp/stamp.jsp?tp=&arnumber=5963679>>, IEEE Transactions on Knowledge and Data Engineering, Jul. 29, 2011, pp. 1-15.
Chen, et al., "A Query Substitution-Search Result Refinement Approach for Long Query Web Searches," retrieved at <<http://ieeexplore.ieee.org/stamp/stamp.jsp?tp=&arnumber=5286069>>, IEEE/WIC/ACM International Joint Conferences on Web Intelligence and Intelligent Agent Technologies (WI-IAT), 2009, pp. 245-251.

(56) References Cited

OTHER PUBLICATIONS

Jain, et al., "Domain-Independent Entity Extraction from Web Search Query Logs," retrieved at <<http://www.marcopennacchiotti.com/pro/publications/WWW_2011_2.pdf>>, Proceedings of the 20th International Conference Companion on World Wide Web, Mar. 28, 2011, pp. 63-64.

Chaudhuri, et al., "Robust and Efficient Fuzzy Match for Online Data Cleaning," retrieved at <<http://research.microsoft.com/pubs/75996/bm_sigmod03.pdf>>, SIGMOD'03, Proceedings of the 2003 ACM SIGMOD International Conference on Management of Data, Jun. 9, 2003, 12 pages.

Minjuan, et al., "Pseudo-Relevance Feedback Driven for XML Query Expansion," retrieved at http://www.aicit.org/jcit/ppl/JCIT0509_15.pdf>>, Journal of Convergence Information Technology, vol. 5, No. 9, Nov. 2010, pp. 146-156.

Hipp, et al., "Algorithms for Association Rule Mining—A General Survey and Comparison", ACM SIGKDD Explorations Newsletter, vol. 2, Issue 1, Jun. 2000, pp. 58-64.

Pasquier, et al., "Efficient Mining of Association Rules Using Closed Itemset Lattices", 1999 Elsevier Science Ltd., vol. 24, No. 1, pp. 25-46.

Kowalski, et al., "Information Storage and Retrieval Systems", 2002 Kluwer Academic Publishers, pp. 1-36.

Klapaftis, et al., "Google & WordNet Based Word Sense Disambiguation", Proceedings of the 22nd ICML Workshop on Learning & Extending Ontologies, Bonn, Germany, 2005, 5 Pages.

Baeza-Yates, et al., "Extracting Semantic Relations from Query Logs", Yahoo! Research, KDD'07, Aug. 2007, San Jose, California, USA, 10 pages.

Chandel, et al., "Efficient Batch Top-k Search for Dictionary-based Entity Recognition", Retrieved at <<http://www.it.iitb.ac.in/~sunita/papers/icde06b.pdf>>, Proceedings of the IEEE 22nd International Conference on Data Engineering (ICDE '06), Apr. 3-7, 2006, Atlanta, Georgia, 10 Pages.

Kasliwal, et al., "Text Mining in Biomedical Literature", Retrieved at <<http://www.cse.iitb.ac.in/~sourabh/seminar/final/seminar_report>>, Retrieved at least as early as Mar. 9, 2009, Department of Computer Science and Engineering, Indian Institute of Technology, Bombay, India, 27 Pages.

U.S. Appl. No. 12/235,635, filed Sep. 23, 2008, Paparizos, et al.
U.S. Appl. No. 12/465,832, filed May 14, 2009, Chaudhuri, et al.
U.S. Appl. No. 12/478,120, filed Jun. 4, 2009, Chaudhuri, et al.
U.S. Appl. No. 12/779,964, filed May 14, 2010, Ganti, et al.

\* cited by examiner

ANY LOCAL/REMOTE DISTRIBUTION OF SYNONYM-GENERATING FUNCTIONALITY AND/OR ASSOCIATED DATA

400d Digital Camera" to identify this
ROBUST DISCOVERY OF ENTITY SYNONYMS USING QUERY LOGS This application claims the benefit of U.S. Provisional Application No. 61/606,481 (the '481 application), filed Mar. 5, 2012. The '481 application is incorporated by reference herein in its entirety.

BACKGROUND

A user may input a query into an information retrieval system in attempt to locate information regarding a particular entity. The entity may correspond, for example, to a person, a location, a product, an organization, etc. The user's query, however, may differ from the label (or labels) that the retrieval system uses to identify the entity. For example, the user may input the query "rebel xti" in an attempt to locate a particular type of camera, whereas the retrieval system uses the canonical name "Canon EOS 400d Digital Camera" to identify this camera. This discrepancy between the query and the reference information may result in the failure of the retrieval system to identify the desired information when the user submits his or her query.

In some cases, the retrieval system may automatically expand the user's submitted query to include synonyms of the terms specified in the query, using, for example a thesaurus-type resource. However, a standard thesaurus is not capable handling many types of synonym-generating tasks. For example, a standard thesaurus is ill-equipped to handle the above-described type of query-expansion task.

SUMMARY

Described herein is a similarity analysis framework which generates synonyms for an entity reference string ($r_e$), corresponding to a particular entity e. The similarity analysis framework generates synonyms, if possible, that satisfy a core set of synonym-related properties. To achieve this result, the similarity analysis framework leverages two or more similarity analysis functions. Each similarity analysis function generates similarity score information that takes into consideration one or more of the synonym-related properties. The similarity analysis functions are chosen such that they jointly satisfy the complete set of desired synonym-related properties, although each function may not individually satisfy all of the properties.

According to one illustrative implementation, the similarity analysis functions leverage query log data. The query log data identifies documents that users have selected in response to the submission of queries.

According to one illustrative implementation, one synonym-related property that the similarity analysis framework satisfies is symmetry. This means that a candidate string $s_e$ is considered a valid synonym for $r_e$ only if $r_e$ is also considered a valid synonym for $s_e$. An asymmetric similarity analysis function can achieve this result by computing similarity in "both directions," that is, by determining the similarity of $s_e$ with respect to $r_e$, and vice versa. In other cases, a similarity analysis function may implicitly satisfy the symmetry property without explicitly performing two-way analysis.

One similarity analysis function for use in the framework is referred to herein as a pseudo-document similarity analysis function. The pseudo-document similarity analysis function provides robust similarity score information even in the presence of sparse query log data. The framework also provides an indexing mechanism that expedites the resource-intensive computations performed by the pseudo-document similarity analysis function.

Another similarity analysis function is referred to herein as a query context similarity analysis function. This function takes into consideration the class of the entity reference string $r_e$ with respect to the class of each candidate string $s_e$. This ensures that the synonyms that are generated will be germane to the topic to which $r_e$ pertains.

According to another illustrative feature, the framework also provides a reduction module that converts a long entity reference string $r_e$ into a shorter entity reference string $r_e'$, if possible, where the terms in $r_e'$ are a subset of the terms that appear in $r_e$. In one implementation, the reduction module can rely on fuzzy-matching functionality to perform this task. In another implementation, the reduction module can leverage a search engine's API to perform this task.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
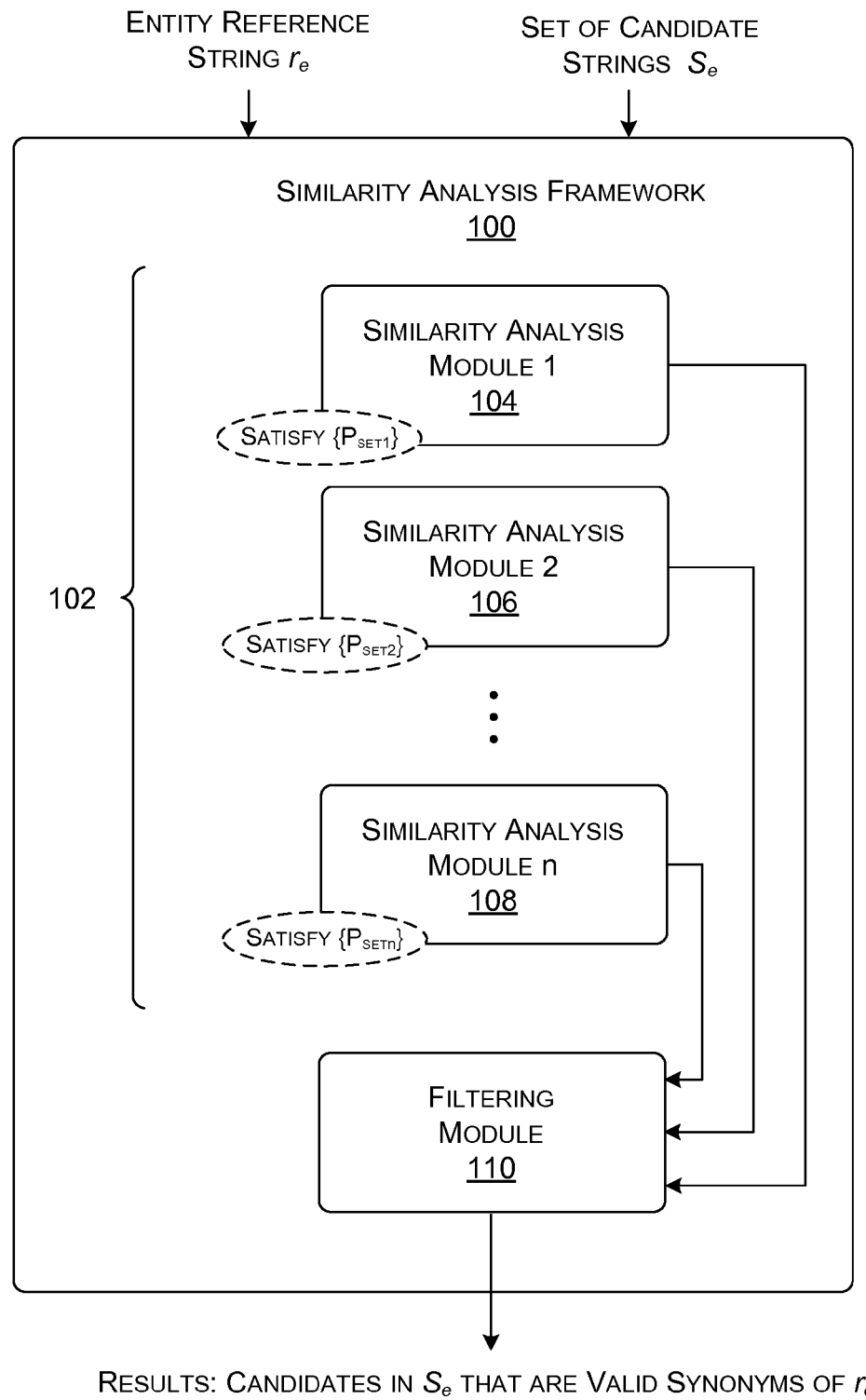
FIG. 1 shows a high-level view of a similarity analysis framework that is used to generate synonyms of an entity reference string $r_e$ using two or more similarity analysis modules.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of an illustrative similarity analysis framework for generating synonyms using two or more similarity analysis functions. Section B describes an illustrative pseudo-document similarity analysis system, which may correspond to one component of the overall framework described in Section A. Section C describes an illustrative query context similarity analysis system, which may correspond to another component of the overall framework described in Section A. Section D describes one implementation of the overall similarity analysis framework of Section A in greater detail. Section E describes various implementations of a reduction module which shortens entity reference strings. And Section F describes illustrative computing functionality that can be used to implement any aspect of the features described in the previous sections.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section F, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The similarity analysis framework that is described herein is said to generate at least one synonym based on query log data. In some cases, however, the similarity analysis framework may find no synonyms which satisfy the specified criteria. Similarly, the similarity analysis framework is said to generate a shortened version of a long entity reference string. In some cases, however, the similarity analysis framework may find no such shorted version of the long entity reference string. For simplicity, this qualification is not always expressly mentioned below.

The term "set" includes a group having any number of members, including zero members, or one member, or two or more members.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview of an Illustrative Similarity Analysis Framework FIG. 1 shows a high-level view of a similarity analysis framework 100 that is used to generate synonyms of an entity reference string $r_e$ using two or more similarity analysis modules 102. More specifically, an entity e refers to topical subject of any nature. Without limitation, for example, the entity may correspond to a person, place, event, organization, location, product, service, etc. Alternatively, or in addition, the entity may correspond to an abstract concept. An entity reference string $r_e$ refers to a label that is associated with the entity. In many cases, the $r_e$ corresponds to a proper noun, although it need not be a proper noun. Any $r_e$ may include one or more terms, t.

The similarity analysis framework 100 generates at least one synonym for the $r_e$ (if possible) by drawing from a set of potential candidate strings $S_e$, where $s_e$ refers to an individual candidate string in the set $S_e$. A synonym is a string, having one or more terms, which refers to the same entity e as $r_e$, but in a different manner than $r_e$. A synonym need not have the same number of terms as $r_e$. Further, a synonym need not "look" the same as $r_e$ from a textual (e.g., edit distance) standpoint (although it may). It is assumed herein that both $r_e$ and the candidate strings are unambiguous, meaning that each of these strings corresponds to a single entity.

From a high-level perspective, the similarity analysis framework 100 generates synonyms which satisfy a set of core synonym-related properties. This means that, in order to be deemed valid, a synonym is asked to satisfy all of the core synonym-related properties (in addition to being unambiguous). In one illustrative implementation, the core synonym-related properties include the following:

Symmetry. A pair $(r_e, s_e)$ satisfies the symmetry property if $s_e$ is a valid synonym of $r_e$ (denoted by $s_e \rightarrow r_e$), and if $r_e$ is a valid synonym of $s_e$ (denoted by $r_e \rightarrow s_e$).

Strength-of-Similarity. A pair $(r_e, s_e)$ satisfies the strength-of-similarity property if a strength of similarity between $r_e$ and $s_e$ exceeds a prescribed strength-related threshold (or thresholds).

Relatedness-of-class. A pair $(r_e, s_e)$ satisfies the relatedness-of-class property if $r_e$ and $s_e$ correspond to a same class, e.g., the same topic. For example, consider the two strings "Nikon 345x camera discount price" and "Nikon 345x camera repair manual." These two strings have many of the same terms in common. But the first string likely refers to the sale of a camera, while the second string likely refers to the repair of the camera. Hence, these two strings may not be appropriate synonyms of each other.

The above three properties are cited by way of illustration, not limitation. Other implementations of the similarity analysis framework 100 may generate synonyms that satisfy additional (or fewer) synonym-related properties compared to those specified above, and/or other synonym-related properties compared to those specified above. For example, another implementation can ensure that synonyms satisfy a transitivity property, such that if B and C are synonyms of A, then B and C are synonyms of each other.

The collection of similarity analysis modules 102 includes three similarity analysis module, namely, a first similarity analysis module 104, a second similarity analysis module 106, and a third similarity analysis module 108. However, the similarity analysis framework 100 can include any number of such modules. For example, Section D describes one similarity analysis framework that includes two similarity analysis modules. Each similarity analysis module 104 assesses the similarity between each candidate pair of $r_e$ and $s_e$ based on a particular analysis paradigm, to yield similarity score information.

More specifically, each similarity analysis module produces similarity score information that satisfies a subset of the core set of synonym-related properties. For example, the first similarity analysis module 104 may produce similarity score information based primarily on a consideration of the strength-of-similarity property. The second similarity analysis module 106 may produce similarity score information based primarily on the relatedness-of-class property. The similarity analysis framework 100 as a whole produces similarity score information which satisfies all of the synonym-related properties by virtue of the fact that it combines the different similarity analysis modules into a single framework. That is, a lack in one similarity analysis module is made up by the capabilities of another similarity analysis module.

Further, different similarity analysis functions may be subject to noise to differing extents. Noise refers to any factors which cause the similarity analysis functions to produce incorrect conclusions. The synonym analysis framework 100 can again offset the potential weakness of some similarity analysis functions with the complementary strengths of other similarity analysis functions.

In some cases, an individual similarity analysis module embodies a similarity analysis function which is implicitly symmetric in nature, meaning that, if it determines that $s_e$ is suitably similar to $r_e$, then it has also implicitly determined that $r_e$ is suitably similar to $s_e$. In other cases, a similarity analysis function is not implicitly symmetric in nature. To address this issue, such a similarity analysis module can perform checking in "both directions," e.g., by checking whether $s_e$ is similar to $r_e$, and checking whether $r_e$ is similar to $s_e$; only if these two tests are satisfied will $s_e$ be regarded as a proper synonym of $r_e$.

Finally, a filtering module 110 receives the similarity score information from the similarity analysis modules 102. It uses this similarity score information to pick out candidate strings which are valid synonyms of $r_e$. These valid synonyms are synonyms which satisfy all of the core properties. The filtering module 110 can be implementing in different ways. In one approach, the filtering module 110 determines, for each $s_e$, whether the similarity score information satisfies one or more thresholds associated with the core properties. In another case, aspects of the filtering module 110 can be integrated into the individual similarity analysis modules 102. For example, a similarity analysis module may generate similarity score information for a particular $s_e$, and then immediately check whether that information satisfies appropriate thresholds. If the similarity analysis module determines that the particular $s_e$ does not meet the threshold(s), it may prevent other similarity analysis modules from performing analysis on this $s_e$. In other words, FIG. 1 indicates that the similarity analysis modules 102 operates in parallel and then pass their results to the filtering module 110; but, alternatively, or in addition, they can operate in a cascaded hierarchical fashion.

Figure 2:
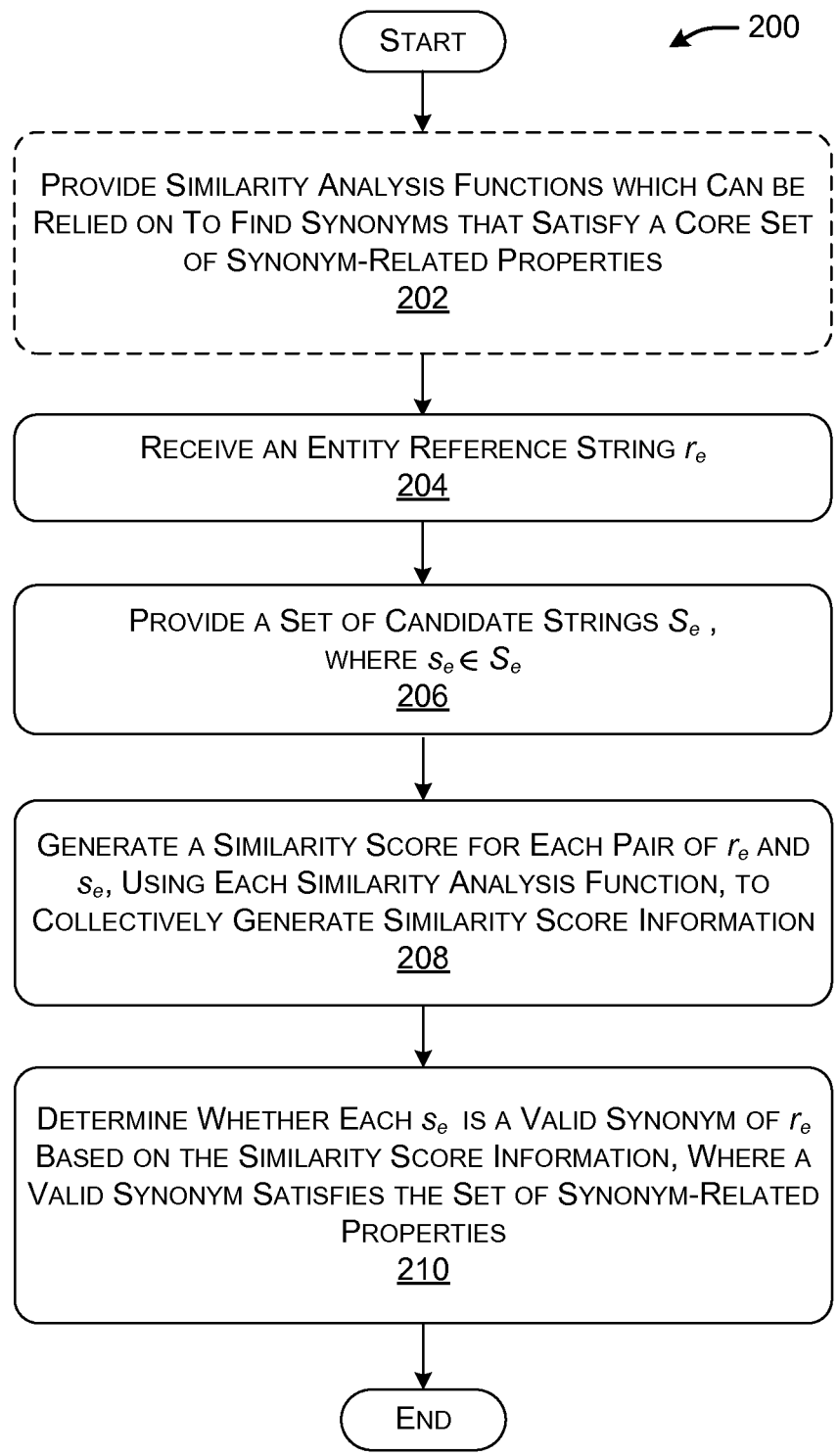
FIG. 2 is a flowchart that describes one manner of operation of the framework of FIG. 1.

FIG. 2 shows a procedure 200 that summarizes one manner of operation of the similarity analysis framework 100 of FIG. 1. In block 202, the similarity analysis framework 100 is configured in such a manner that it provides a collection of similarity analysis functions. Jointly considered, the similarity analysis functions produce synonym score information which satisfies a set of core synonym-related properties. In block 204, the similarity analysis framework 100 receives an entity reference string $r_e$. In block 206, the similarity analysis framework 100 provides a set of candidate strings $S_e$ (e.g., by receiving or generating it), comprising at least one candidate string $s_e$. To perform this operation, the similarity analysis framework 100 leverages query log data provided in a query log, as will be described in detail in the next section. In block 208, the similarity analysis framework 100 generates a similarity score for each pair of $r_e$ and $s_e$ using each of the similarity analysis functions (provided, in turn, by the respective similarity analysis modules 102). In block 210, the similarity analysis framework 100 leverages the filtering module 110 to identify one or more candidate strings (if any) that are valid synonyms of $r_e$, based on the similarity score information provided in block 208 in conjunction with one or more thresholds.

B. Illustrative Pseudo-Document Similarity Analysis System

Figure 3:
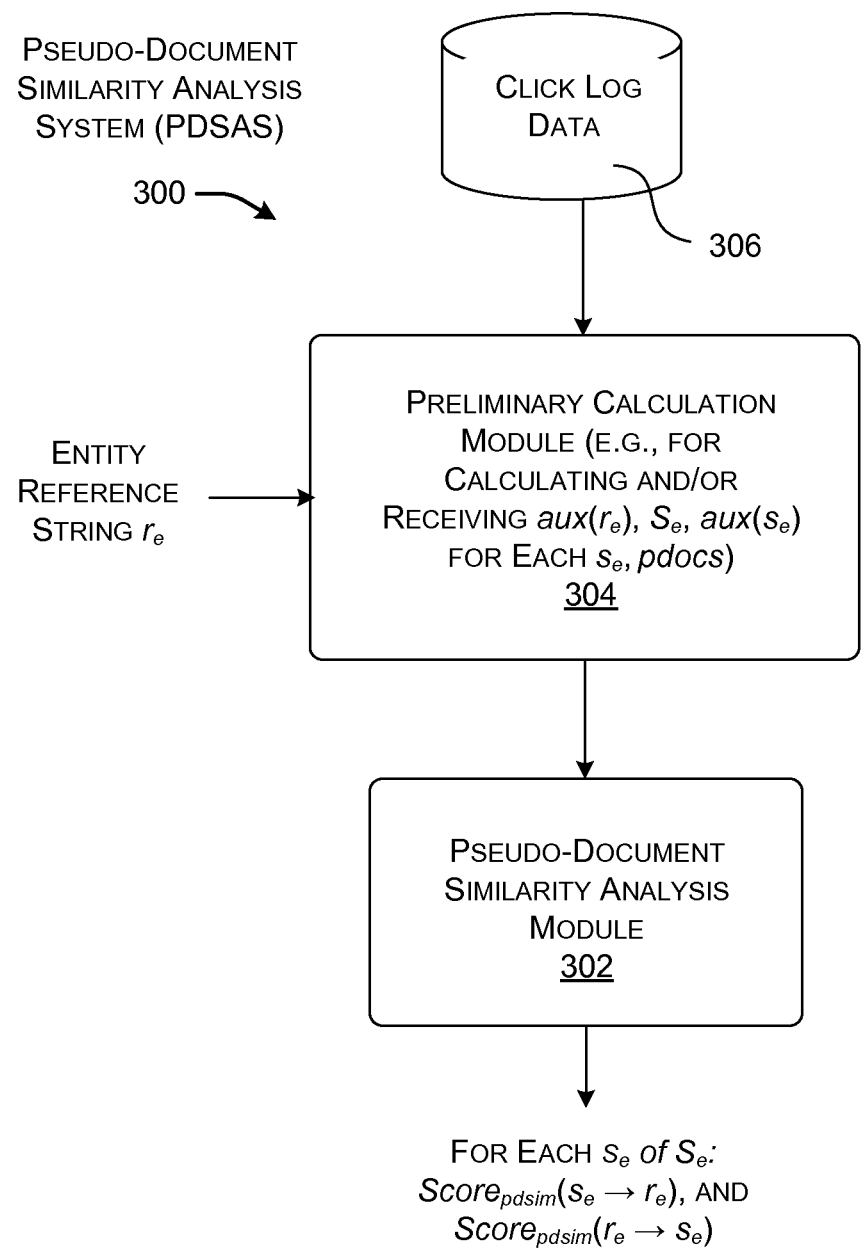
FIG. 3 shows a pseudo-document similarity analysis system (PDSAS), which may be used to implement one of the similarity analysis modules shown in FIG. 1.

FIG. 3 shows a pseudo-document similarity analysis system (PDSAS) 300, which may be used to implement one of the similarity analysis modules 102 shown in FIG. 1. The PDSAS 300 includes a pseudo-document similarity analysis module 302 for generating, for each pair of $s_e$ and $r_e$, a first score, $Score_{pdsim}(s_e \rightarrow r_e)$, which measures how similar $s_e$ is to $r_e$, and a second score, $Score_{pdsim}(r_e \rightarrow s_e)$, which measures how similar $r_e$ is to $s_e$. The pseudo-document similarity analysis module 302 may receive various input information from a preliminary calculation module 304. However, before delving further into the explanation of FIG. 3, it will be instructive to explore what is meant by the term pseudo-document.

Figure 4:
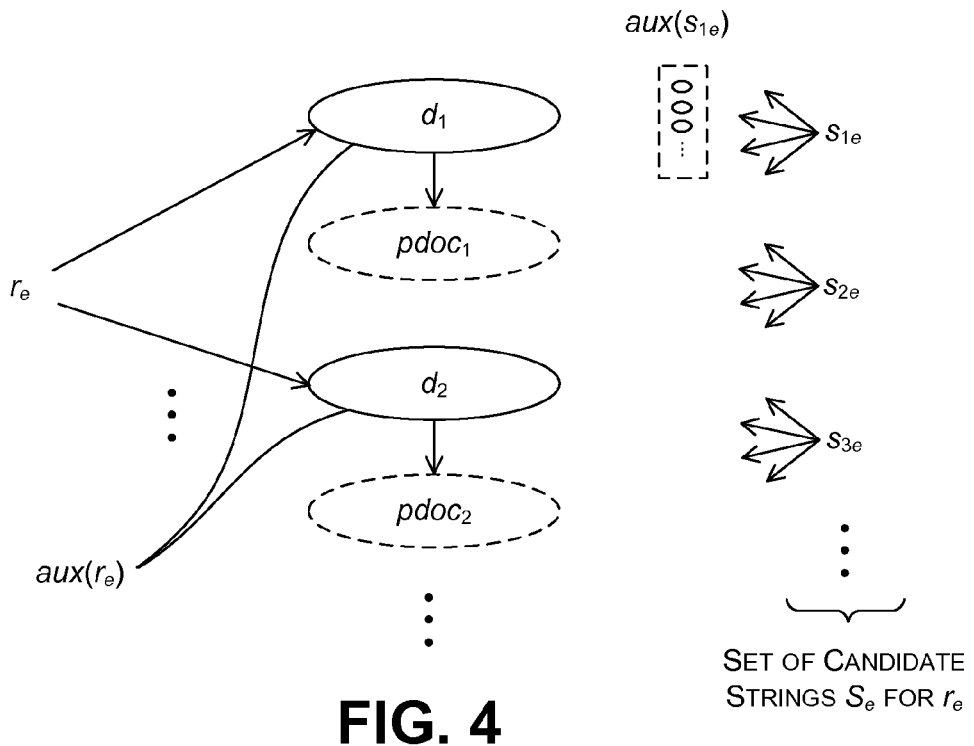
FIGS. 4 and 5 show examples which explain one manner of operation of the PDSAS of FIG. 3.

Consider the example of FIG. 4. Here, the preliminary calculation module 304 receives an entity reference string $r_e$ as input. By consulting query log data in a query log 306, the preliminary calculation module 304 determines a set of documents D that a population of users clicked on (or otherwise selected) after submitting the string $r_e$ as a query. That is, these users may correspond to people who have interacted with a commercial search engine or the like to perform searches for any reason. For example, assume that $r_e$ corresponds to the string "Space Needle." Further assume that at least one prior user who uses a search system has submitted the term "Space Needle," and, upon receiving a list of results from the search system, clicked on (or otherwise selected) a web page related to the Space Needle tower in Seattle. This means that one of the documents d in the set D corresponds to the website that this user accessed on a prior occasion. The query log 306 can furnish this information because it contains a historical record of the queries submitted by users, together with the selection-related actions taken by users in response to submitting those queries. The set of documents D is also referred to as auxiliary information for $r_e$ (i.e., $aux(r_e)$) because it provides auxiliary evidence that can be used to assess the relationship between $r_e$ and different candidate strings.

Next, the preliminary calculation module 304 generates a candidate set $S_e$ of candidate strings, where $s_e \in S_e$. The preliminary calculation module 304 can again leverage the query log 306 to generate these candidate strings by identifying, for each document d in D, the queries that users have submitted which "led" to the selection of the document d. The set of candidate strings is formed by aggregating these queries for all of the documents in D. For example, again assume that the website associated with the Space Needle tower is one of the documents in D. Assume that at least one user accessed the Space Needle website after submitting the query "Seattle tower." This means that one of the candidate strings in the set of candidate strings $S_e$ will be "Seattle tower."

For reasons to be clarified below, the preliminary calculation module 304 also determines, for each candidate string $s_e$, the documents that users selected after submitting $s_e$ as a query. In other words, this set of document parallels the set of documents D for $r_e$, but is produced based on $s_e$, not $r_e$. This set of documents for each $s_e$ is referred to as auxiliary information for $s_e$, or $aux(s_e)$.

At this point, the preliminary calculation module 304 can calculate a pseudo-document for each document d in D. Or the preliminary calculation module 304 can receive pseudo-documents that have been generated in advance in offline fashion. A pseudo-document pdoc for a document d contains a combination of all the terms associated with all of the queries that are linked to d. A query is linked to d when a user accesses d in response to submitting the query.

Figure 5:
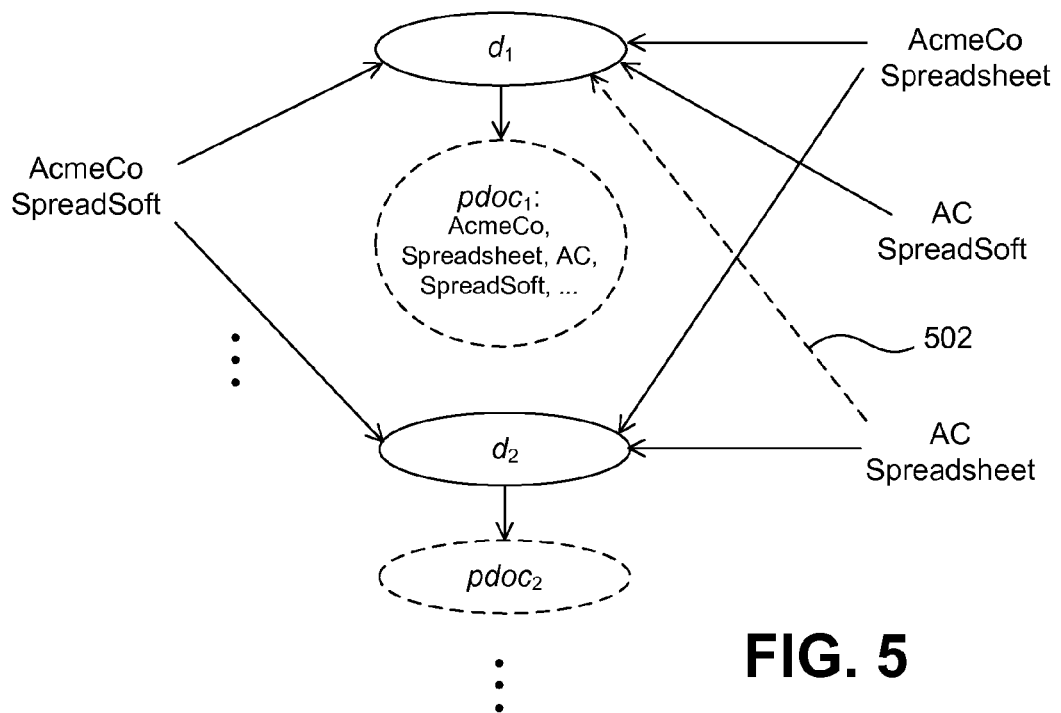

FIG. 5 sets forth an example which clarifies the nature of a pseudo-document. Assume that $r_e$ corresponds to the string "AcmeCo SpreadSoft," which is a (fictitious) name of a spreadsheet software product produced by a (fictitious) company, AcmeCo. Assume that the preliminary calculation module 304 generates auxiliary information $aux(s_e)$ that comprises a collection of documents, two of which are shown in FIG. 5. Further assume that the candidate strings that are linked to the first two documents include "AcmeCo Spreadsheet," "AC SpreadSoft," and "AC Spreadsheet." Once again, these are queries that users have submitted in the past, followed by selecting either the first document or the second document. In this case, the pseudo-document $pdoc_1$ for the first document $d_1$ includes at least the following terms: "AcmeCo," "Spreadsheet," "AC," and "SpreadSoft." This is because the queries "AcmeCo Spreadsheet" and "AC SpreadSoft" are linked to this document $d_1$, and these queries include the identified terms "AcmeCo," "Spreadsheet," "AC," and "SpreadSoft." The preliminary calculation module 304 can also generate (or receive) pseudo-documents with respect to the documents in each $aux(s_e)$.

The pseudo-document similarity analysis module 302 can now compute the relationship between a particular $s_e$ and $r_e$. It does this by determining the number of pseudo-documents that include all of the query terms that are present in $s_e$. For example, assume that the $s_e$ in question is the query "AC Spreadsheet" in FIG. 3. No user submitted this query and subsequently clicked on the first document $d_1$. Hence, there is no direct (solid-line) link between this $s_e$ ("AC Spreadsheet") and $d_1$. However, the pseudo-document $d_1$ does in fact include all of the terms in $s_e$, namely "AC" and "Spreadsheet." Therefore, this $s_e$ is considered effectively linked to $d_1$, as indicated by the dashed line 502.

More formally stated, the similarity of a particular $s_e$ to $r_e$ can be computed by:

$$Score_{pdsim}(s_e \rightarrow r_e) = \frac{\text{number of } pdocs \text{ that include all the terms in } s_e}{\text{number of docs } d \text{ in } aux(r_e)}.$$

And the similarity of $r_e$ to a particular $s_e$ can be computed by:

$$Score_{pdsim}(r_e \rightarrow s_e) = \frac{\text{number of } pdocs \text{ that include all the terms in } r_e}{\text{number of docs } d \text{ in } aux(s_e)}.$$

In the first equation, the "pdocs" refers to those pdocs that are associated with the documents in the set $aux(r_e)$. In the second equation, "pdocs" refers to the those pdocs that are associated with the documents in the set $aux(s_e)$.

From a high-level perspective, the PDSAS 300 provides score information which measures the strength of the relationship between a particular $s_e$ and $r_e$. The PDSAS 300 provides useful analysis even in the situation in which the query log 306 does not have many entries for a particular candidate string $s_e$. For example, as noted above, the query log 306 does not indicate a direct link between the "AC Spreadsheet" and document $d_1$. But the PDSAS 300 surmises that this $s_e$ is related to $d_1$ based on the more general observation that this $s_e$ includes many terms found in other queries which are explicitly linked to $d_1$.

As another potential advantage, the words in a pseudo-document are a succinct representation of its content. Hence, by mining synonyms based on pseudo-documents (rather than original documents), the PDSAS 300 can potentially ignore some of the noise found in the original documents.

Figure 6:
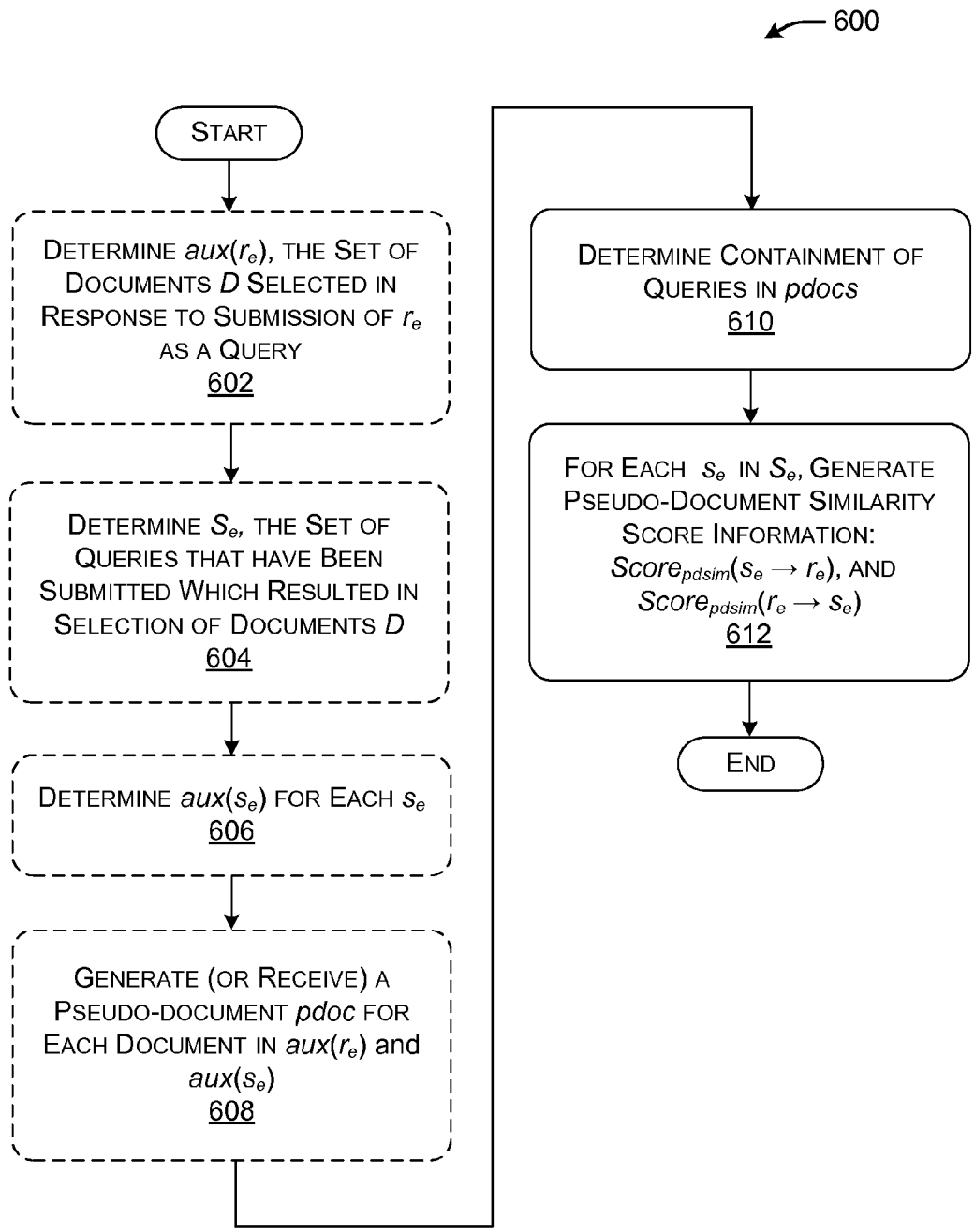
FIG. 6 is a flowchart that describes one manner of operation of the PDSAS of FIG. 3.

Advancing to FIG. 6, this figure shows a procedure 600 that summarizes the description provided above. In block 602, the PDSAS 300 determines, using query log data, a set of documents D that have been selected in response to submitting $r_e$ as a query. This set of documents is also referred to as $aux(r_e)$. In block 604, the PDSAS 300 determines, using the query log data, a set of queries that have been submitted and which have resulted in the selection of any of the documents in the set of documents D. This set of queries serves as a set of candidate strings $S_e$. In block 606, the PDSAS 300 determines aux($s_e$) for each $s_e$, which corresponds to the set of documents selected by users in response to submitting $s_e$ as a query. In block 608, the PDSAS 300 determines pseudo-documents for the documents in aux($r_e$) and each aux($s_e$) (e.g., by generating or receiving the pseudo-documents).

In block 610, the PDSAS 300 determines, for each $s_e$ in $S_e$, a number of pdocs (associated with aux($r_e$)) that include all of the terms in $s_e$. The PDSAS 300 can perform the complementary operation with respect to $r_e$, that is, by determining the number of pdocs (associated with aux($s_e$)) which include all of the terms in $r_e$. In block 612, the PDSAS 300 determines, for each $s_e$, a $Score_{pdsim}(S_e \rightarrow r_e)$ which measures the similarity of $s_e$ with respect to $r_e$, and a $Score_{pdsim}(r_e \rightarrow s_e)$ which measures the similarity of $r_e$ with respect to $s_e$.

Figure 7:
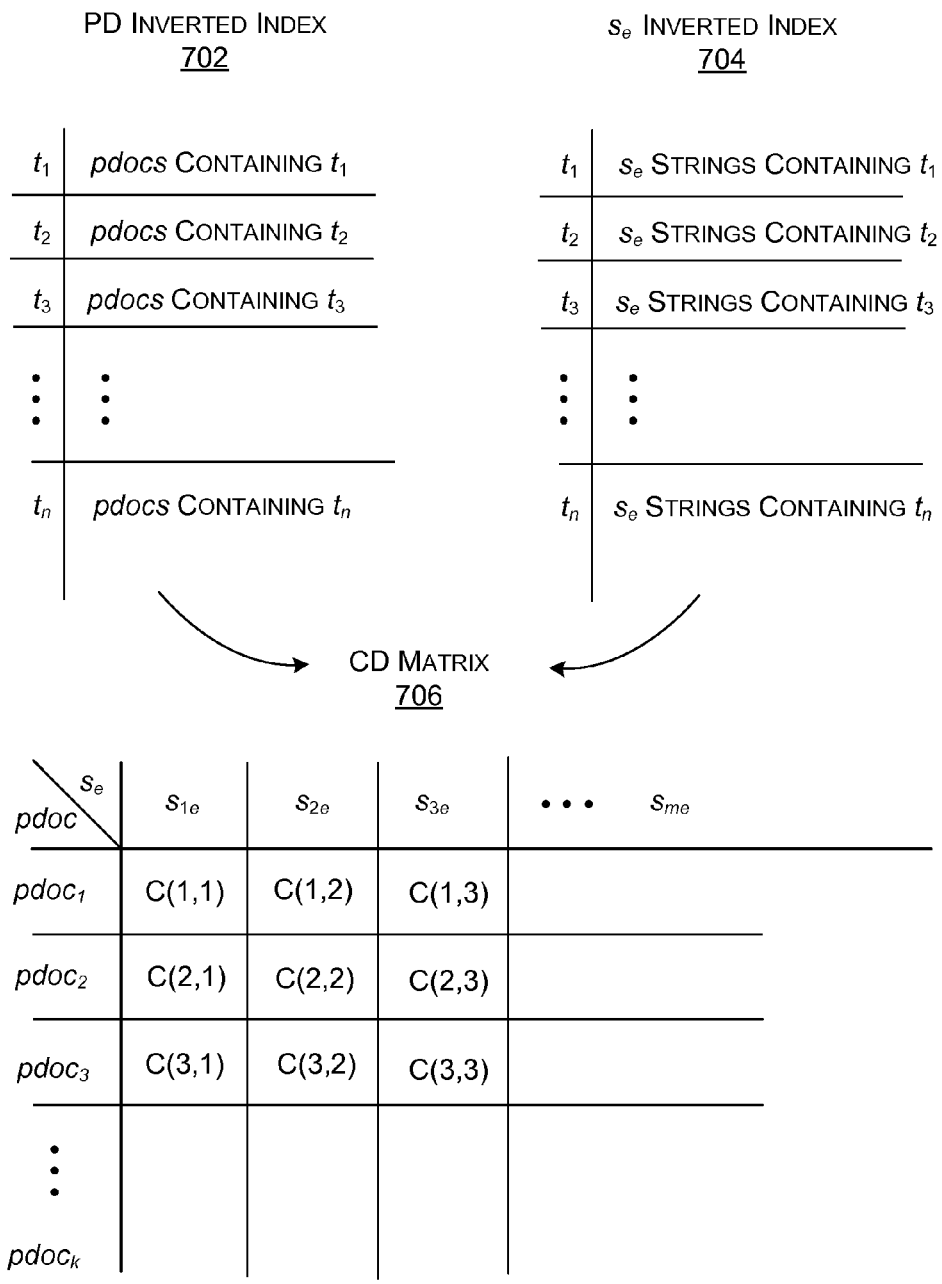
FIG. 7 describes indexing mechanisms that may be relied on by the PDSAS of FIG. 3.

The above-described procedure 600, particularly with respect to the containment checking performed in block 610, is a computationally resource-intensive operation. To expedite the processing, the PDSAS 300 can employ various indexing mechanisms. FIG. 7 illustrates three such indexing mechanisms. More specifically, the following description sets forth the use of the indexing mechanisms with respect to containment checking in the $s_e$-to-$r_e$ direction. Containment checking in the $r_e$-to-$s_e$ direction, although not expressly described, applies the same approach as the $s_e$-to-$r_e$ direction.

First, a PD inverted index 702 maps terms that appear in the set $S_e$ with pdocs that contain those terms. Similarly, an $s_e$ inverted index 704 maps terms that appear in the set $S_e$ with candidate strings which contain those terms. And a CD matrix 706 identifies, for each pairing of a particular $s_e$ and a pdoc, the number of terms in $s_e$ which are included within pdoc. If the $s_e$ includes f terms, then a count f for the pair ($s_e$, pdoc) in the CD matrix indicates that $s_e$ is fully contained in pdoc.

Figure 8:
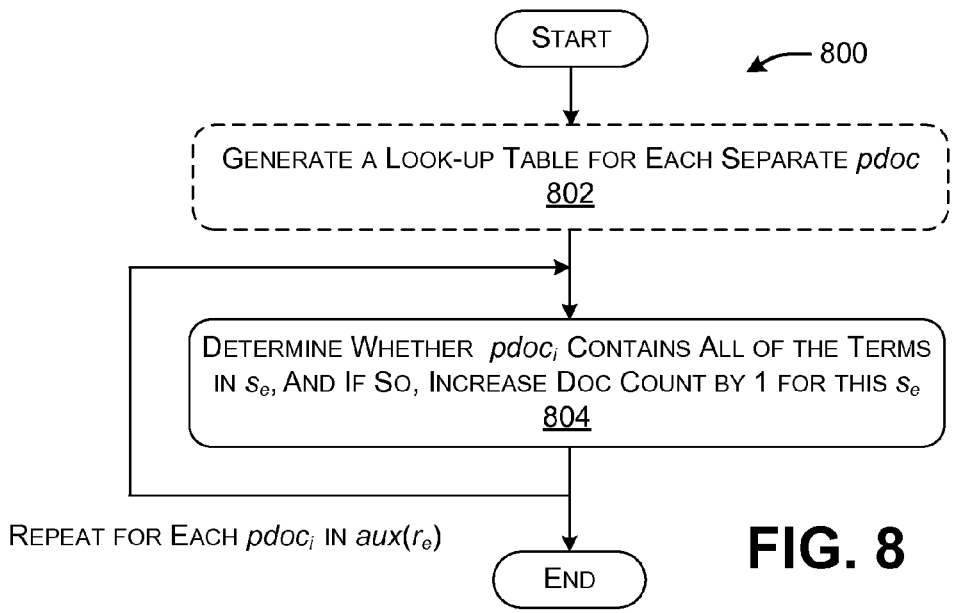
FIG. 8 is a flowchart that describes one manner of determining the containment of a candidate string $s_e$ with respect to a collection of pseudo-documents pdocs.
Figure 9:
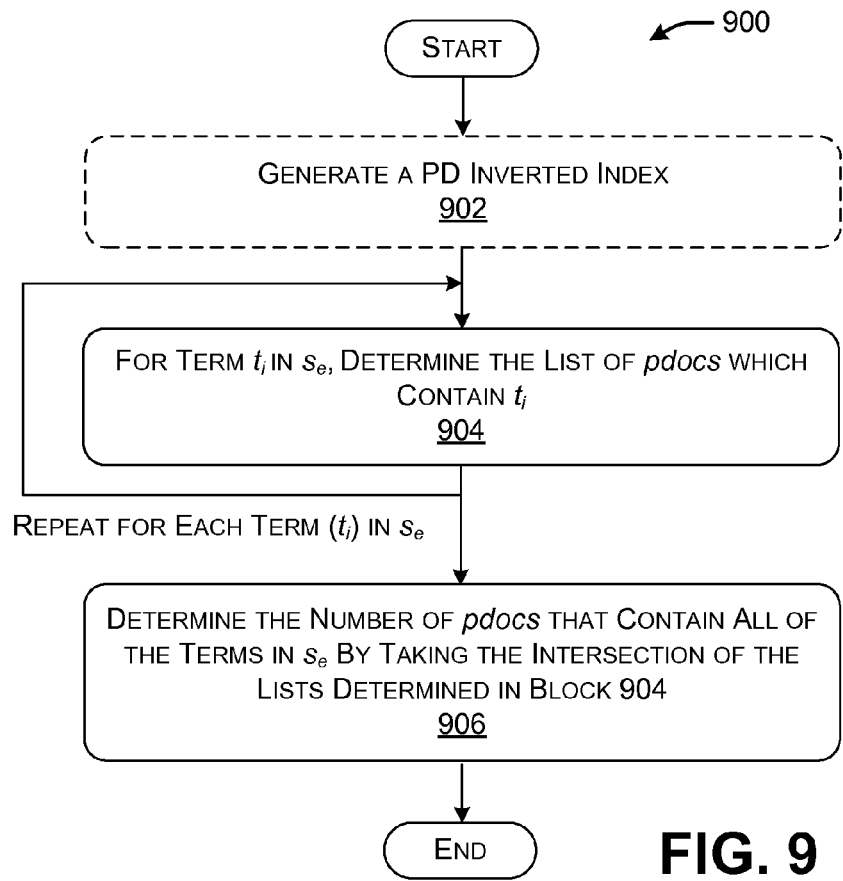
FIG. 9 is a flowchart that describes another manner of determining the containment of a candidate string $s_e$ with respect to a collection of pseudo-documents pdocs.
Figure 10:
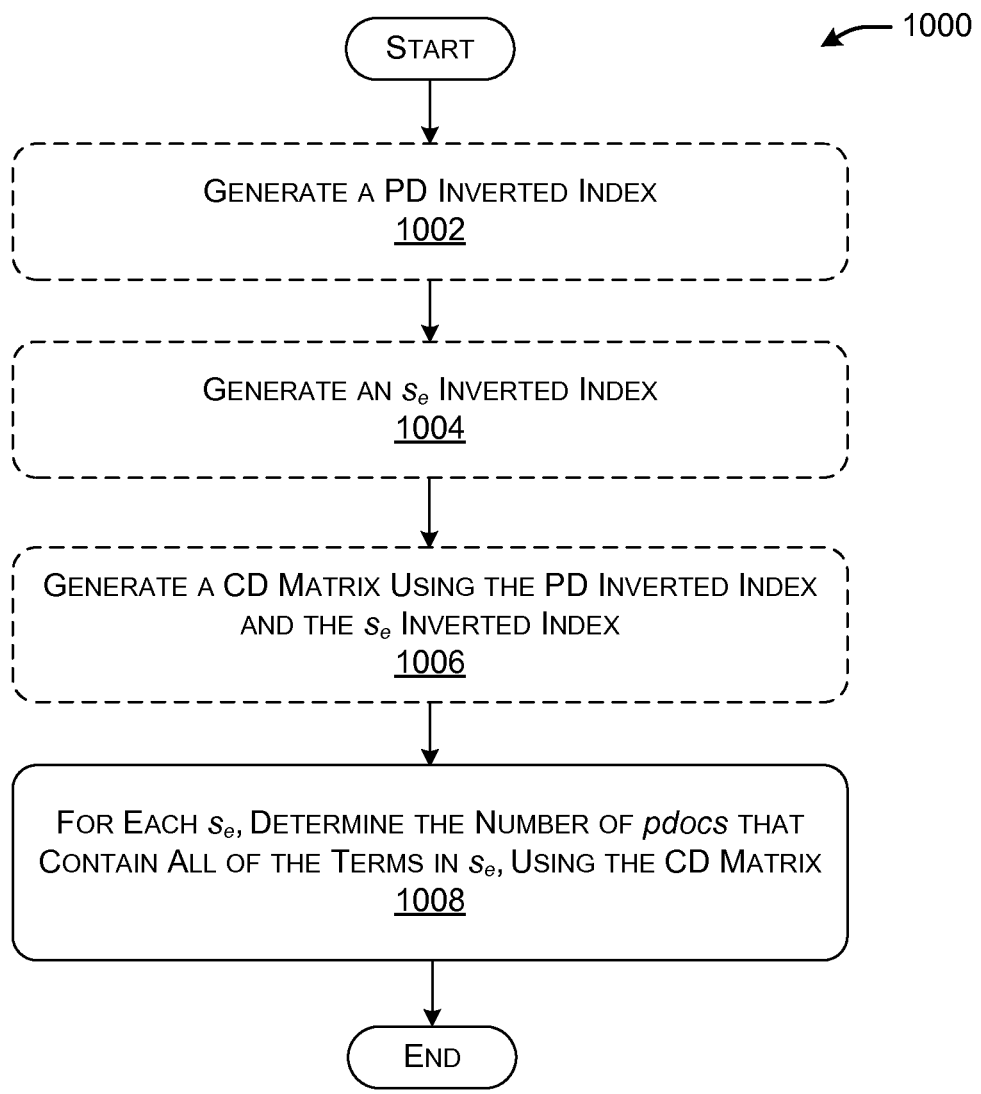
FIG. 10 is a flowchart that describes yet another manner of determining the containment of a candidate string $s_e$ with respect to a collection of pseudo-documents pdocs.

FIGS. 8-10 show three different alternative procedures that may be performed by the PDSAS 300 to determine the containment of $s_e$ in the pseudo-documents. The first procedure 800 of FIG. 8 does not leverage any of the data structures shown in FIG. 7. In block 802, the PDSAS 300 may generate a look-up table (e.g., a hash table) for each separate pdoc. In block 805, the PDSAS 300 successively determines whether $s_e$ is fully contained in each pdoc.

FIG. 9 shows a procedure 900 which uses the PD inverted index 702, and therefore leverages overlap in terms among pseudo-documents. In block 902, the PDSAS 300 builds the PD inverted index 702. In block 904, the PDSAS 300 determines, for each term t in $s_e$, the list of pdocs that contain this term. In block 906, the PDSAS 300 determines the number of pdocs which fully contain $s_e$ by performing an intersection of the lists computed in block 904.

FIG. 10 shows a procedure 1000 which uses all three of the data structures shown in FIG. 7, and therefore takes advantage of overlapping terms found in both the pseudo-documents and the candidate strings. In block 1002, the PDSAS 300 generates the PD inverted index 702. In block 1004, the PDSAS 300 generates the $s_e$ inverted index 704. In block 1006, the PDSAS 300 generates the CD matrix 706. The PDSAS 300 performs block 1006 by advancing through each term in $S_e$. That is, the PDSAS 300 increments an entry in the CD matrix 706 if the corresponding pdoc includes the term in question; this knowledge, in turn, can be gleaned from the PD inverted index 702 and the $s_e$ inverted index 704. In block 1008, the PDSAS 300 uses the CD matrix 706 to determine, for each $s_e$, the number of pdocs that contain all of the terms in $s_e$. As stated above, the PDSAS 300 can perform this operation by counting the number of entries for $s_e$ in the CD matrix 706 for which the count equals the number of terms in $s_e$.

Figure 11:
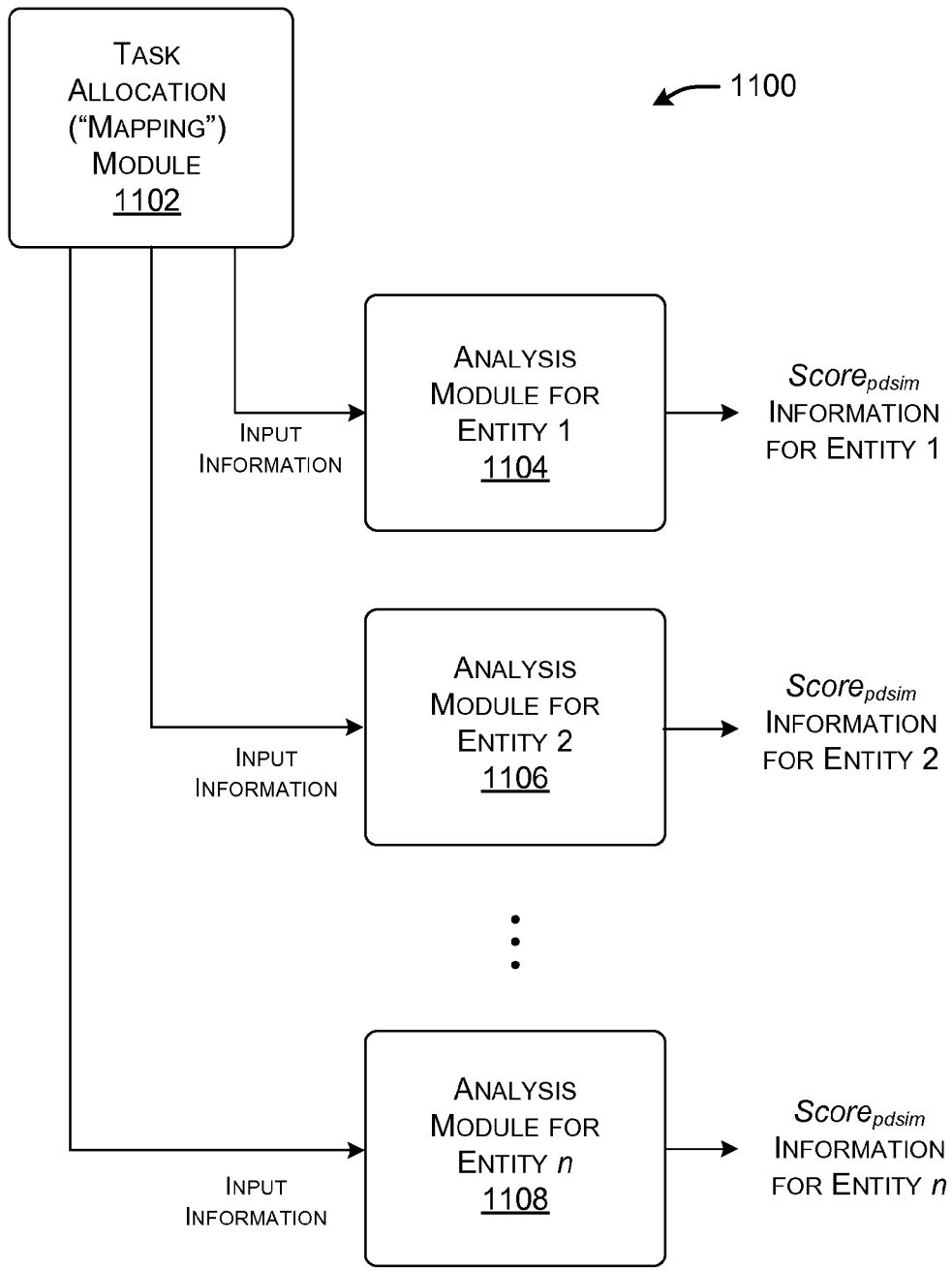
FIG. 11 shows a distributed architecture that can be used to expedite some of the tasks of the PDSAS of FIG. 3.

FIG. 11 shows a distributed architecture 1100 that can be used to perform aspects of the processing illustrated in FIG. 6. A task allocation module 1102 allocates computational tasks to different computational nodes associated with different analysis modules (1104, 1106, . . . 1108). More specifically, the task allocation module 1102 prepares input information associated different respective entities, and then sends those instances of input information to different respective analysis modules. For example, the task allocation module 1102 can send input information for a first $r_e$ to analysis module 1104, input information for a second $r_e$ to analysis module 1106, and so on. Each analysis module can then use its input information to calculate $Score_{pdsim}$ information for its respective entity.

Figure 12:
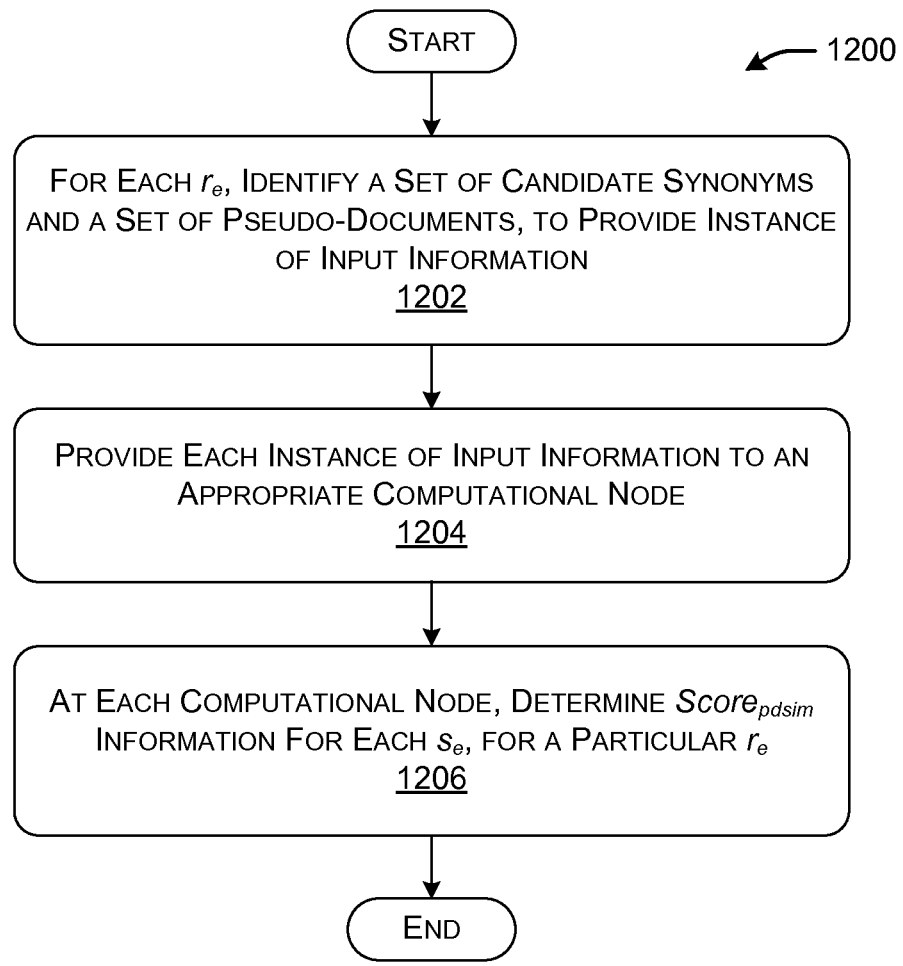
FIG. 12 is a flowchart that describes one manner of operation of the distributed architecture of FIG. 11.

FIG. 12 describes one manner of operation of the distributed architecture 1100 of FIG. 11. In block 1202, the PDSAS 300 identifies a set of candidate synonyms and a set of pseudo-documents for each $r_e$. This information constitutes input information. In block 1204, the PDSAS 300 sends instances of the input information to appropriate computational nodes, e.g., so that each computational node receives data pertaining to a different entity. In block 1206, each computational node determines the $Score_{pdsim}$ information for its particular $r_e$ based on the input information that is has received.

FIGS. 11 and 12 can use other strategies to partition tasks among different computational nodes. For example, in another implementation, each computational node can perform computations with respect to a set of entities, rather than a single entity. Further, the above algorithms involve determination of whether each $s_e$ is fully contained in each pseudo-document. Other implementations can define "containment" in other environment-specific ways, e.g., by not necessarily requiring that every term in $s_e$ appear in a pseudo-document.

C. Illustrative Query Context Similarity Analysis System

Figure 13:
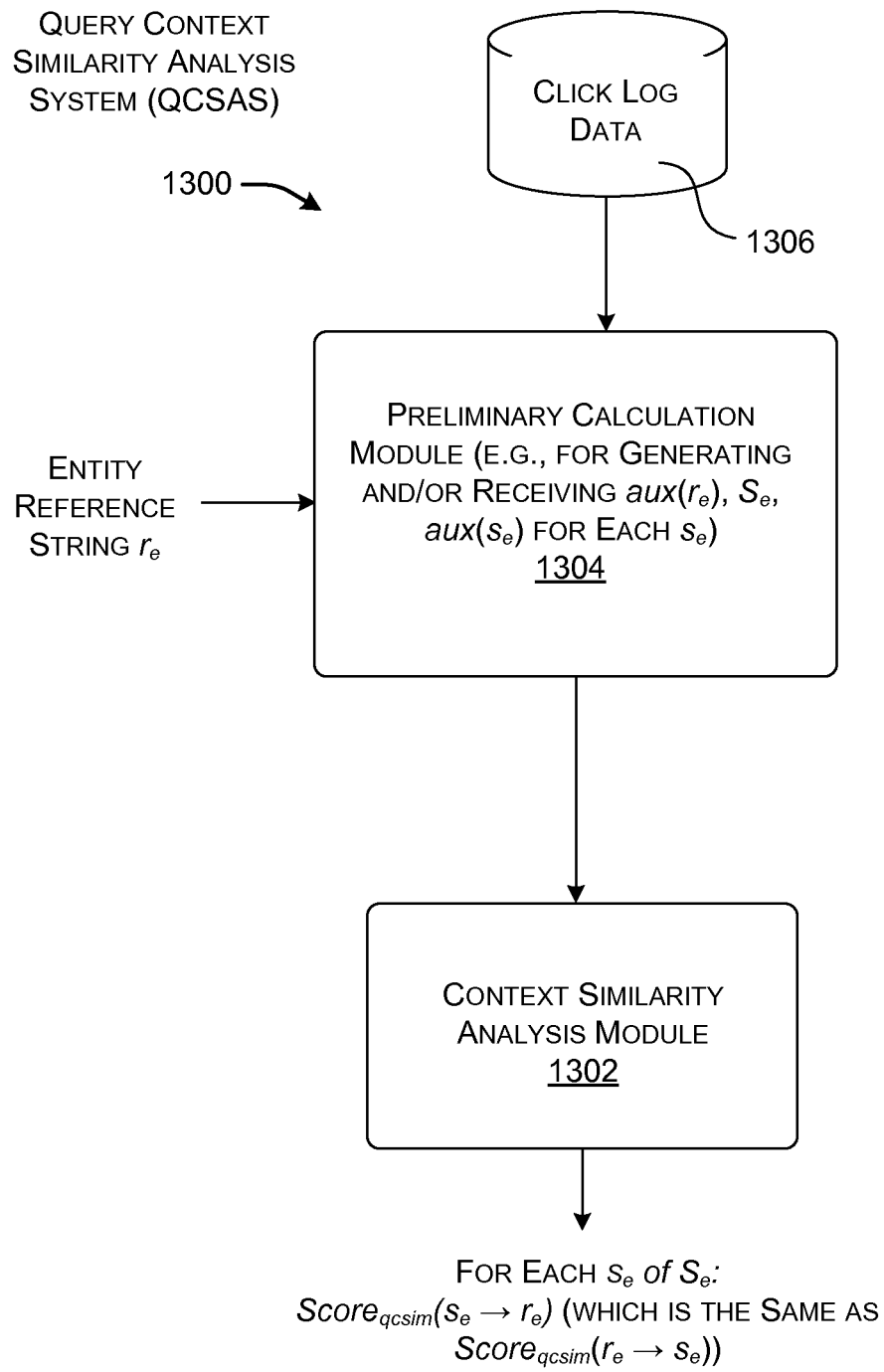
FIG. 13 shows a query context similarity analysis system (QCSAS), which may be used to implement one of the similarity analysis modules shown in FIG. 1.

FIG. 13 shows a query context similarity analysis system (QCSAS) 1300, which may be used to implement one of the similarity analysis modules 102 shown in FIG. 1. The QCSAS 1300 includes a context similarity analysis module 1302 for computing $Score_{qcsim}$ information for each pair of $r_e$ and $s_e$, which measures the strength of relatedness of $s_e$ to $r_e$. The $Score_{qcsim}$ information is symmetrical, so that there is no need to compute this information in both directions in the manner of the $Score_{pdsim}$ information. In general, the QCSAS 1300 generates relatedness measures that take into account the class of each $r_e$ and $s_e$. In contrast, the PDSAS 300 does not explicitly take this information into account.

The QCSAS 1300 includes a preliminary calculation module 1304 for computing (and/or receiving) various information that is fed into the context similarity analysis module 1302 as input. The preliminary calculation module 1304, in turn, relies on query log data provided by a query log 1306.

Figure 14:
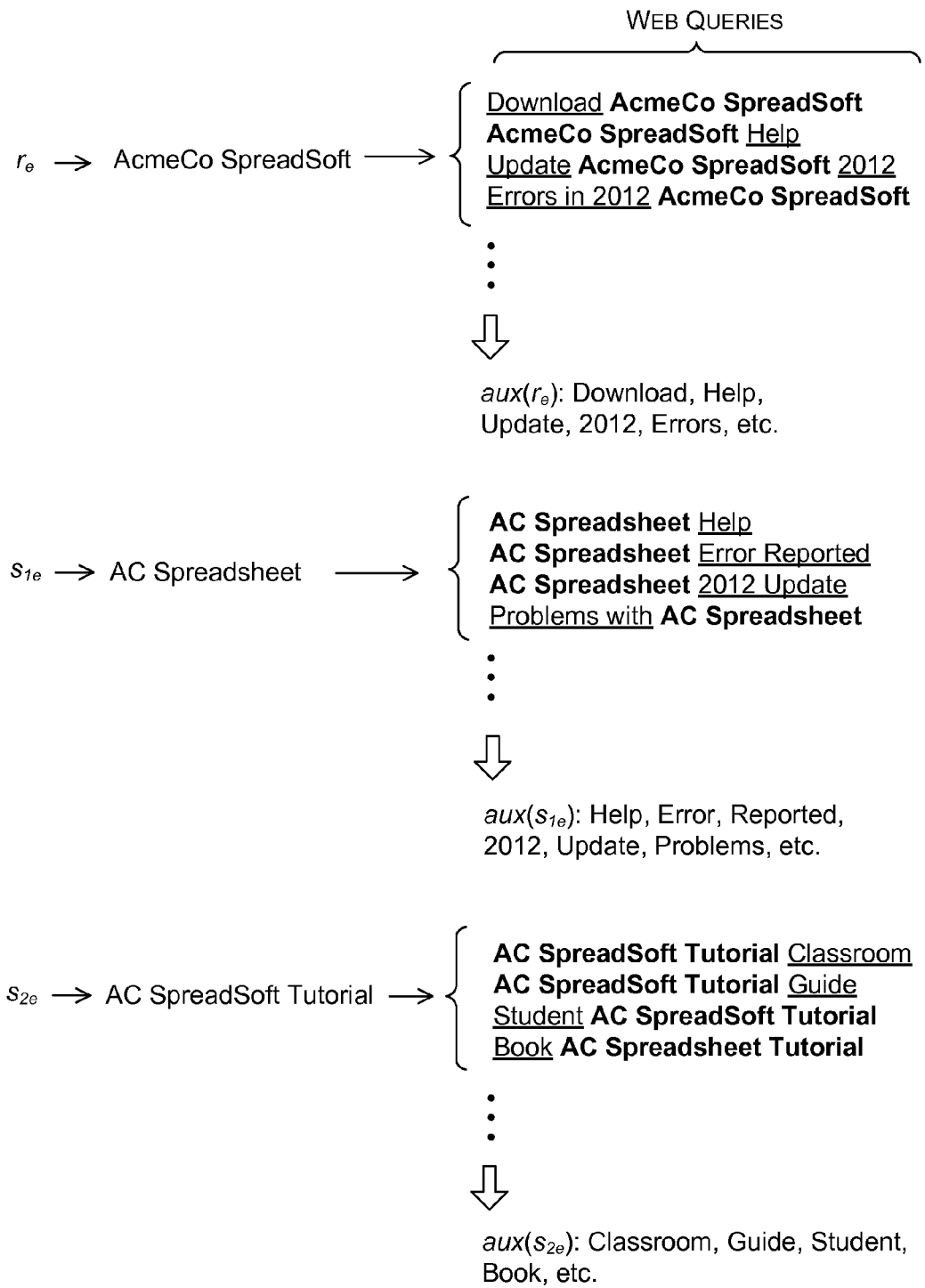
FIG. 14 shows an example of the operation of the QCSAS of FIG. 13.

To more readily understand the operation of the QCSAS 1300, consider the example of FIG. 14. The preliminary calculation module 1304 generates a set of candidate strings $S_e$ in the same manner described above with respect to the PDSAS 300. That is, the preliminary calculation module 1304 determines the set of documents D that users have clicked on (or otherwise selected) after submitting the query $r_e$, and then identifies the queries which were submitted and which subsequently led to clicking on any of the documents in D. These queries comprise candidate strings of $S_e$.

In the case of the QCSAS 1300, however, the auxiliary information aux($r_e$) corresponds to the words in submitted queries which occur before $r_e$ and/or after $r_e$ (e.g., within a certain term distance of $r_e$, e.g., 1, 2, or 3 words to either side of $r_e$). Similarly, for each $s_e$, the auxiliary information aux($s_e$) corresponds to the words in submitted queries that occur before $s_e$ and/or after $s_e$.

Consider the case in which $r_e$ corresponds to the reference string "AcmeCo SpreadSoft," and two of the candidate strings correspond to "AC Spreadsheet" and "AC SpreadSoft Tutorial." The $r_e$ occurs in queries that also include the nearby words "Download," "Help," "Update," "2012," "Errors," etc. Thus, the aux($r_e$) contains these words. As a whole, it appears that users who submit this $r_e$ as a query are interested in acquiring or maintaining a software product named SpreadSoft.

The first $s_e$, $s_{1e}$, includes auxiliary information aux($s_{1e}$) that includes the words "Help," "Error, "Reported," "2012," "Update," "Problems," etc. Some of the context words in aux($r_e$) overlap with the context words in aux($s_{1e}$). From this observation, it can be concluded that $r_e$ and $s_{1e}$ may pertain to the same topical class. In contrast, the auxiliary information aux($s_{2e}$) for $s_{2e}$ contains the context words "Classroom," "Guide," "Student," "Book," etc. From this evidence, it appears that $s_{2e}$ is directed to a different topic compared to $r_e$ and $s_{1e}$. That is, $s_{2e}$ appears to pertain to an educational topic that relates to the software product in question, while $r_e$ and $s_{1e}$ appear to pertain to an effort to acquire or maintain this product.

The auxiliary information described above is also generally referred to as context information. The preliminary calculation module 1304 can compute this context information by examining queries in the query log 1306 and/or by receiving context information that has already been computed in advance in offline fashion.

Upon collecting the appropriate input information, the context similarity analysis module 1302 computes its score similarity information for a pair ($r_e$, $s_e$) as follows:

$$Score_{qcsim}(s_e \rightarrow r_e) = Score_{qcsim}(r_e \rightarrow s_e) = \frac{|aux(s_e) \cap aux(r_e)|}{|aux(s_e) \cup aux(r_e)|}.$$

In other words, the symmetrical $Score_{qcsim}$ information is proportional to the number of context words in aux($s_e$) that overlap with the context words in aux($r_e$), in relation to the total number of words in both aux($s_e$) and aux($r_e$).

Figure 15:
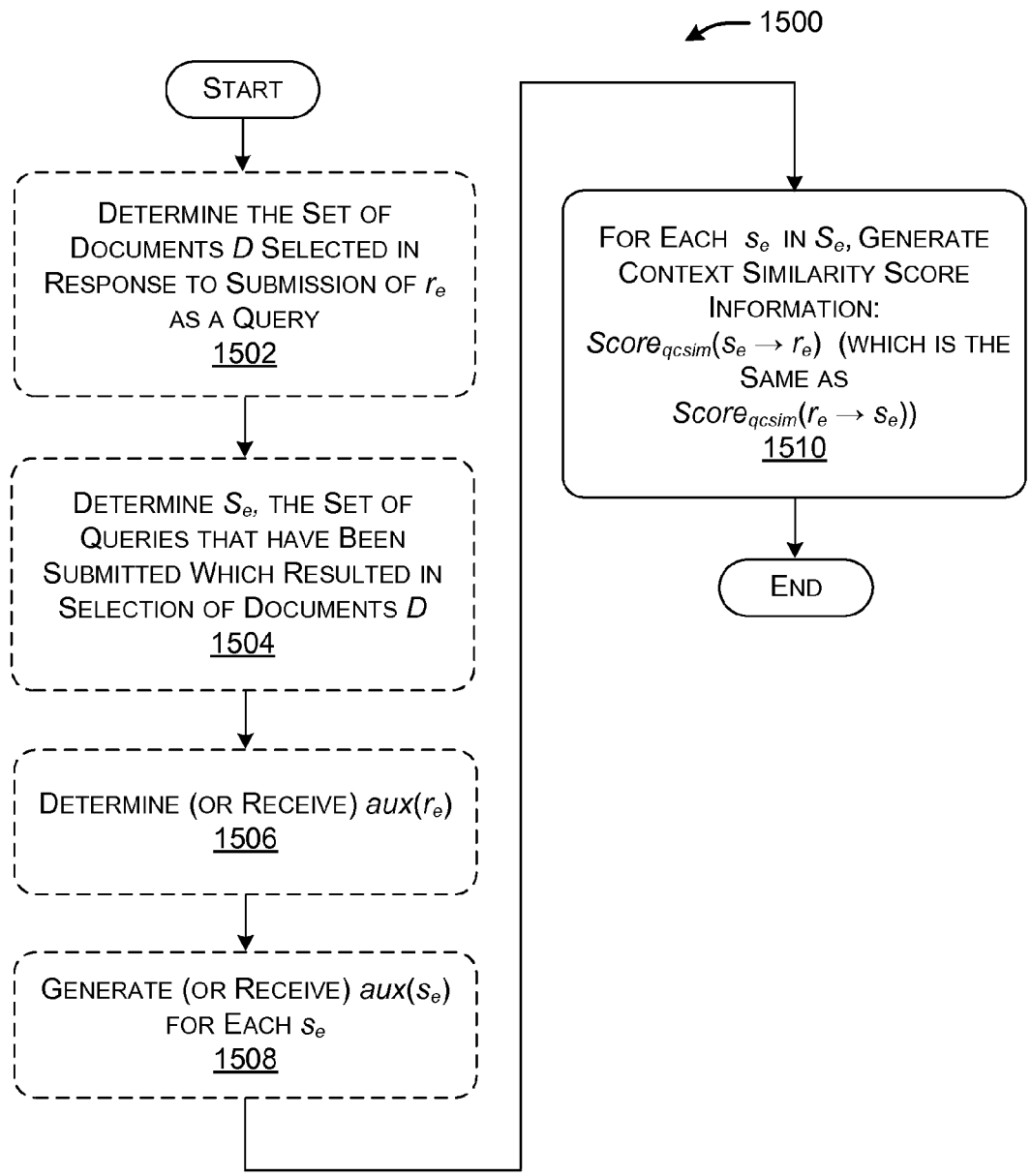
FIG. 15 is a flowchart that describes one manner of operation of the QCSAS of FIG. 13.

FIG. 15 is a procedure 1500 that describes one manner of operation of the QCSAS 1300 of FIG. 13. In block 1502, the QCSAS 1300 generates the set of documents that have been selected in response to submission of $r_e$ as a query. In block 1504, the QCSAS 1300 determines $S_e$, the set of queries that have been submitted which have resulted in selection of the documents in D. In block 1506, the QCSAS 1300 determines (or receives) auxiliary information aux($r_e$), which corresponds to words in queries which are nearby $r_e$. In block 1508, the QCSAS 1300 determines (or receives) auxiliary information aux($s_e$) for each $s_e$, which corresponds to words in queries which are nearby $s_e$. In block 1510, the QCAS uses the information collected in the preceding blocks to determine the $Score_{qcsim}$ information.

D. Illustrative Similarity Analysis Framework

Figure 16:
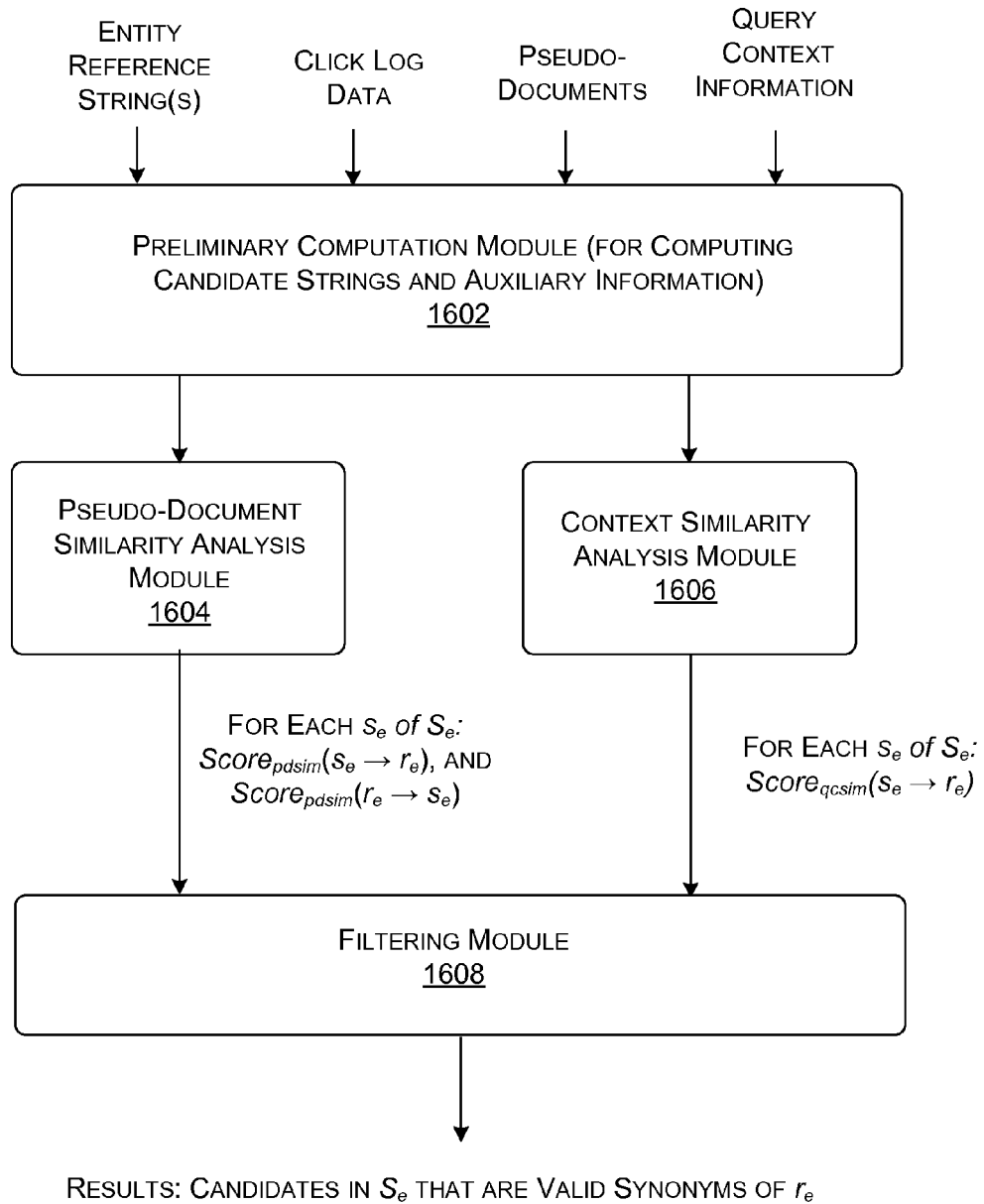
FIG. 16 shows an overall similarity analysis framework, which incorporates aspects of the PDSAS of FIG. 3 and the QCSAS of FIG. 13.

FIG. 16 shows an overall similarity analysis framework 1600, which incorporates aspects of the PDSAS 300 of FIG. 3 and the QCSAS 1300 of FIG. 13. The similarity analysis framework 1600 includes a preliminary computation module 1602 which performs at least some of the actions carried out by the same-named components in FIGS. 3 and 13. That is, the preliminary computation module 1602 generates the set of candidate strings $S_e$. The preliminary computation module 1602 also generates and the auxiliary information to be used for performing pseudo-document-based similarity analysis, as well as the auxiliary information to be used for performing context-based similarity analysis (where the auxiliary information is not the same for these two different types of analyses).

The preliminary computation module 1602 may optionally receive input information that includes some pre-generated information. For example, in addition to receiving entity reference strings and query log data, the preliminary computation module 1602 can receive pre-generated pseudo-documents and/or pre-generated context information. In one implementation, a backend system (not shown) can update the pseudo-documents and/or the context information on any basis, such as a weekly basis, a monthly basis, a half-yearly basis, etc.

A pseudo-document similarity analysis module 1604 computes the $Score_{pdsim}(s_e \rightarrow r_e)$ and $Score_{pdsim}(r_e \rightarrow s_e)$ in the manner described above. A context similarity analysis module 1606 computes the $Score_{qcsim}(s_e \rightarrow r_e)$ in the manner described above. A filtering module 1608 applies various thresholds to the similarity score information produced by these modules (1604, 1606) to generate a final list candidate strings (if any) which satisfy all of the synonym-related properties of the similarity analysis framework 1600. For example, the filtering module 1608 can determine whether each candidate string $s_e$ satisfies: $Score_{pdsim}(s_e \rightarrow r_e) \geq \theta_1$ AND $Score_{pdsim}(r_e \rightarrow s_e) \geq \theta_2$ AND $Score_{qcsim}(s_e \rightarrow r_e) \geq \theta_3$, where $\theta_1$, $\theta_2$, and $\theta_3$ are environment-specific thresholds. Only candidate strings that satisfy all of these relations are deemed to be valid synonyms for $r_e$. Instead of performing this comparison all at once, it can be performed in hierarchical cascaded fashion as the score information becomes available.

Figure 17:
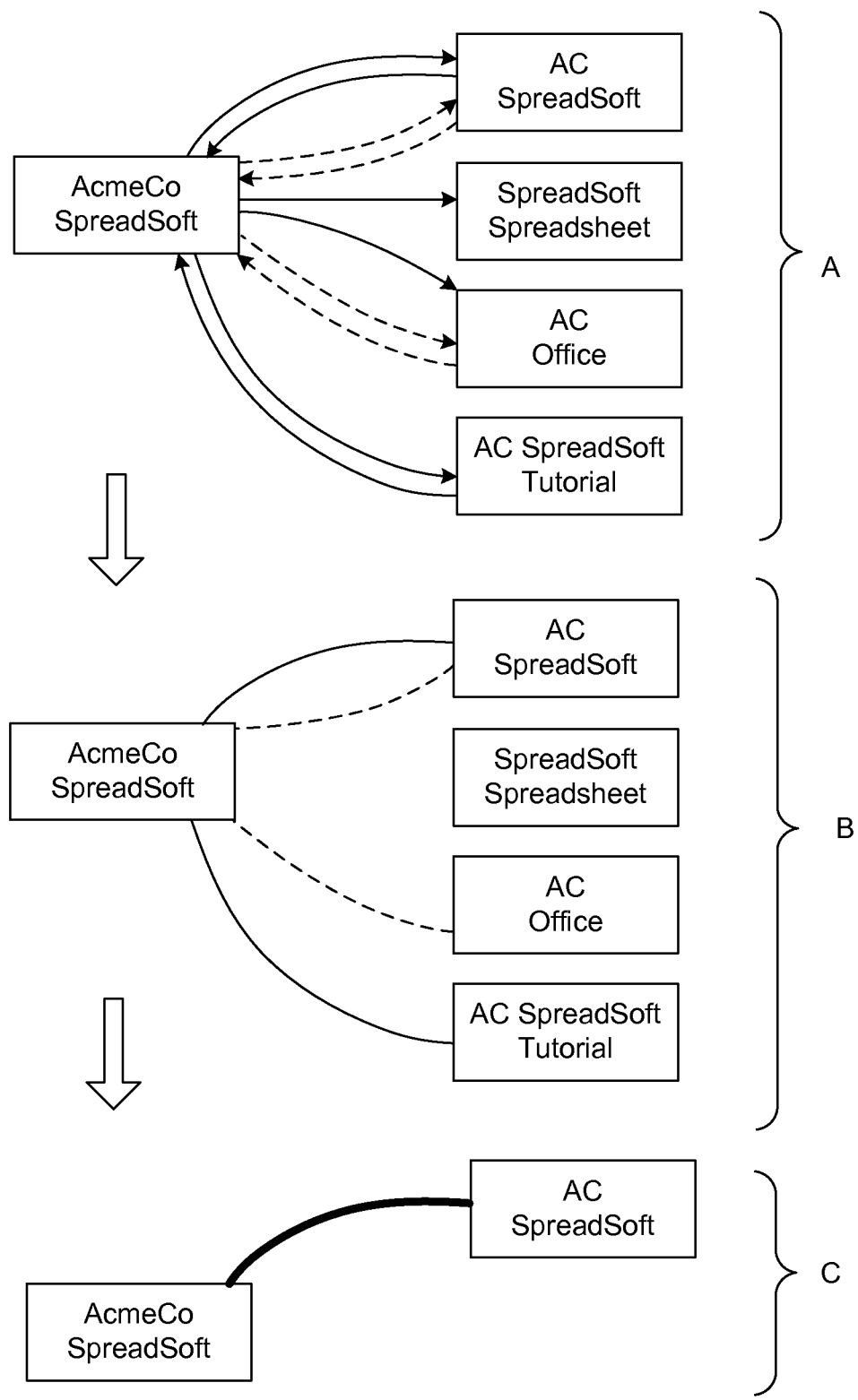
FIG. 17 shows an example of the operation of the similarity analysis framework of FIG. 16.

FIG. 17 shows an example which illustrates the operation of the similarity analysis framework 1600 of FIG. 16. This figure shows three states (A, B, C) for tutorial purposes. That is, these states clarify the effect that different constraints have on the selection of candidate strings. But the actual similarity analysis framework 1600 need not apply the constraints in an order associated with these three states. That is, the similarity analysis framework 1600 can apply all of the constraints at the same time to produce the final state (C) of FIG. 17.

Assume that $r_e$ in this case is "AcmeCo SpreadSoft," and four of the candidate strings are "AC SpreadSoft," "SpreadSoft Spreadsheet," "AC Office," and "AC SpreadSoft Tutorial." In state A, the similarity analysis framework 1600 has used two similarity analysis functions (provided by two respective analysis modules) to provide two sets of relationships between $r_e$ and $S_e$. Links established by the first similarity analysis function are shown in solid lines, while links established by the second similarity analysis function are shown in dashed lines. As indicated, with respect to the first similarity analysis function, there is a two-way similarity relationship between "AcmeCo SpreadSoft" and "AC SpreadSoft," and between "AcmeCoSpreadSoft" and "AC SpreadSoft Tutorial." Similarly, for the second similarity analysis function, there is a two-way similarity relationship between "AcmeCo SpreadSoft" and "ACSpreadSoft," and between "AcmeCo SpreadSoft" and "AC Office."

In state B, the similarity analysis framework 1600 eliminates all links that are not implicitly or explicitly two-way in nature. This has the effect of eliminating the one-way links between "AcmeCo SpreadSoft" and "SpreadSoft Spreadsheet," and between "AcmeCo SpreadSoft" and "AC Office."

In state C, the similarity analysis framework 1600 eliminates other candidate links because they do not satisfy one or more thresholds associated with one or more respective similarity analysis functions (such as the query context similarity function, which will eliminate at least the "AC Spreadsheet Tutorial" candidate string). One relationship remains—the relationship between "AcmeCo SpreadSoft" and "AC SpreadSoft." This means that the similarity analysis framework 1600 identifies just "AC SpreadSoft" as a proper synonym of "AcmeCo SpreadSoft."

Figure 18:
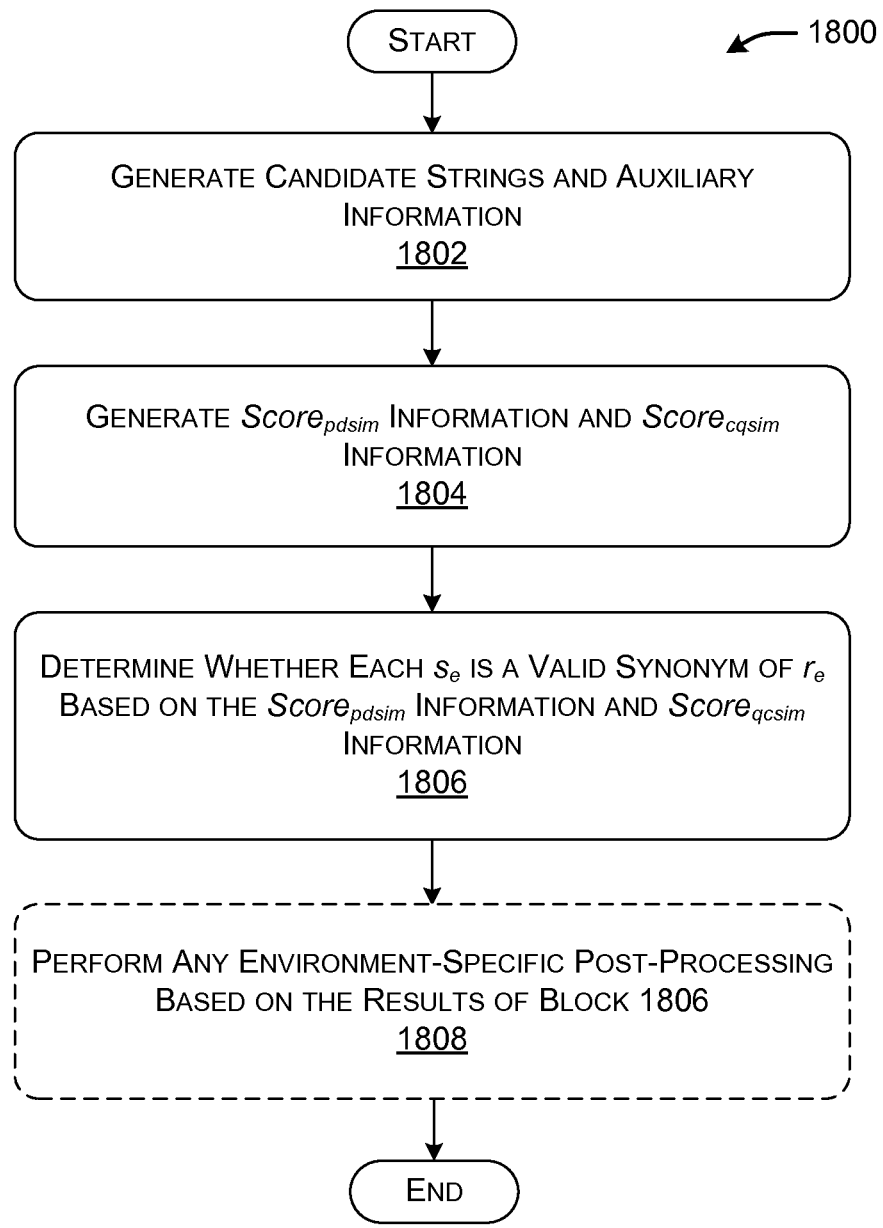
FIG. 18 is a flowchart that describes one manner of operation of the similarity analysis framework of FIG. 16.

FIG. 18 shows a procedure 1700 which summarizes one manner of operation of the similarity analysis framework 1600 of FIG. 16. In block 1802, the similarity analysis framework 1600 receives input information and computes candidate strings and appropriate auxiliary information (with respect to at least one $r_e$). In block 1804, the similarity analysis framework 1600 generates $Score_{pdsim}$ information and $Score_{qcsim}$ information. In block 1806, the similarity analysis framework 1600 determines whether each $s_e$ is a valid synonym of $r_e$ based on the $Score_{pdsim}$ and $Score_{qcsim}$ information, together with appropriate filtering thresholds.

In block 1808 the similarity analysis framework 1600 can perform environment-specific processing based on the synonyms it has generated in block 1808. Consider a lookup table which contains a collection of reference entity strings in an original (e.g., a canonical) state. In one application, a table updating engine (not shown) may rely on the similarity analysis framework 1600 to supply synonyms for each $r_e$ specified in the original lookup table. The table updating engine then adds the synonyms to the lookup table, associating them with their respective entity reference strings. Henceforth, the lookup table can be used to provide a more robust interpretation of a user's query.

For example, in the example of FIG. 17, assume that it is determined that "AC SpreadSoft" is a valid synonym for "AcmeCo SpreadSoft." The table updating engine can modify the lookup table to reflect this conclusion. Subsequently, assume that a user generates a query or other request for information regarding the software product in question, using the term "AC SpreadSoft." The lookup table will be able to successfully interpret the user's request and supply appropriate resources regarding the software product in question.

In another implementation, aspects of the processing performed by the similarity analysis framework 1600 can be carried out in real-time or near-real-time when a user submits a query. That is, when the user submits a query, the similarity analysis framework 1600 can determine one or more synonyms of the query. Based on the expanded query, the similarity analysis framework 1600 can then direct the user to appropriate material associated with the entity being sought. Still other applications of the similarity analysis framework are possible.

As another clarification, this disclosure has set forth the use of the PDSAS 300 and the QCSAS 1300 as components within the overriding similarity analysis framework 1600 of FIG. 16. But in other implementations, the PDSAS 300 and/or the QCSAS 1300 can be used by themselves, or can be integrated into other frameworks besides the similarity analysis framework 1600.

E. Illustrative Reduction Module Functionality

In certain cases, the similarity analysis framework 1600 may not be fully successful in generating successful synonyms for $r_e$ because $r_e$ is too long and detailed. For example, consider the illustrative $r_e$: "Canon EOS 350D, digital camera, 8 MP, 3× Optical Zoom." This $r_e$ may correspond to a canonical way of referring to a particular camera. But because it is so long and technically detailed, there is a possibility that few (if any) users may have submitted queries in the past corresponding to this $r_e$. To address this situation, the similarity analysis framework 1600 of FIG. 16 can provide a reduction module to convert a long $r_e$ into a counterpart thereof, i.e., $r_e'$ (if possible). The similarity analysis framework 1600 can then perform all of the above-described synonym-generating processing with respect to $r_e'$. In addition, the processing described in this section can be applied to systems and environments besides the framework set forth in Section D.

Figure 19:
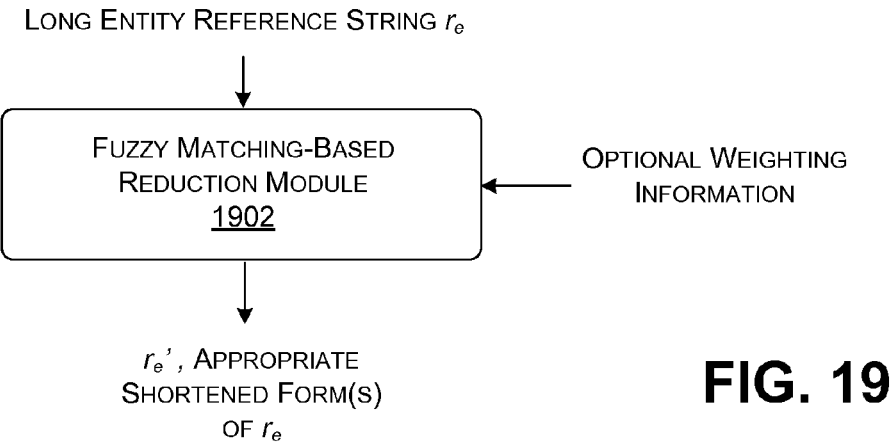
FIG. 19 shows a first implementation of a reduction module for use in shortening entity reference strings, which uses fuzzy-matching functionality.

FIG. 19 shows a first implementation of a reduction module 1902 for shortening entity reference strings. This implementation uses fuzzy-matching functionality. More specifically, the reduction module 1902 receives a long entity reference string $r_e$ as input. The reduction module 1902 then removes one or more terms from $r_e$ to produce a provisional $r_e'$. The reduction module 1902 can then use any type of similarity function (such as a Jaccard similarity function) to assess the similarity between the original $r_e$ and $r_e'$. If the strength of similarity exceeds a prescribed environment-specific threshold, then the reduction module 1902 can accept $r_e'$ as a valid shortened version of $r_e$. Moreover, in some implementations, the similarity function can apply any type of weighting consideration(s) when comparing $r_e$ with $r_e'$, such as by using inverse-document-frequency (IDF) information to give more weight to discriminating terms in $r_e$.

Figure 20:
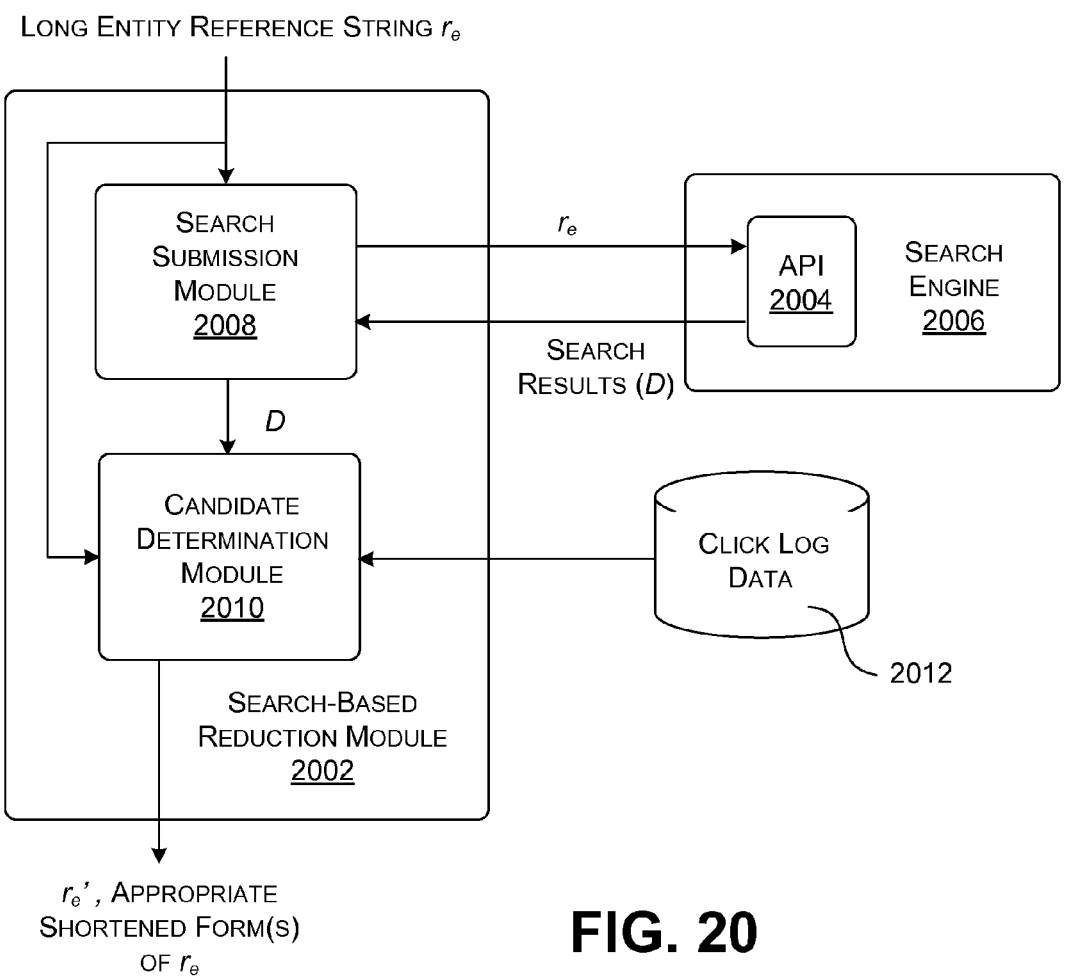
FIG. 20 shows a second implementation of the reduction module, which leverages the API of a search engine.

FIG. 20 shows another reduction module 2002. This reduction module 2002 leverages an API 2004 of a search engine 2006. More specifically, the reduction module 2002 includes a search submission module 2008 which sends a longish $r_e$ as a query to the search engine 2006. The search engine 2006 responds to the query by returning a list of documents D which match $r_e$. A candidate determination module 2010 then leverages a query log 2012 to identify the queries that are linked to the documents D; that is, the candidate determination module 2010 identifies the queries that users submitted, followed by selecting one or more of the documents in the set of documents D. But the candidate determination module 2010 only retains a query if it is made up of terms that correspond to a subset of terms found in $r_e$. For example, if $r_e$ includes terms A, B, C, D, E, and F, a valid query would be {A, C, F}, but not {A, C, P}. This operation provides an initial set of queries.

Finally, the candidate determination module 2010 can apply click similarity analysis to extract queries from the initial set of queries that are likely to be related to $r_e$. For example, consider $r_e'$ which corresponds to a candidate query in the initial set of queries. The candidate determination module 2010 can find the documents ($aux(r_e)$) that were clicked on for $r_e$ and the documents ($aux(r_e')$) that were clicked on for $r_e'$. The candidate determination module 2010 can then form the intersection of $aux(r_e)$ and $aux(r_e')$, and divide the number of entries in that set with the number of entries in $aux(r_e)$. Moreover, the candidate determination module 2010 can perform the same click analysis comparison in the opposite direction, e.g., by comparing the similarity of $r_e$ with respect to $r_e'$.

Figure 21:
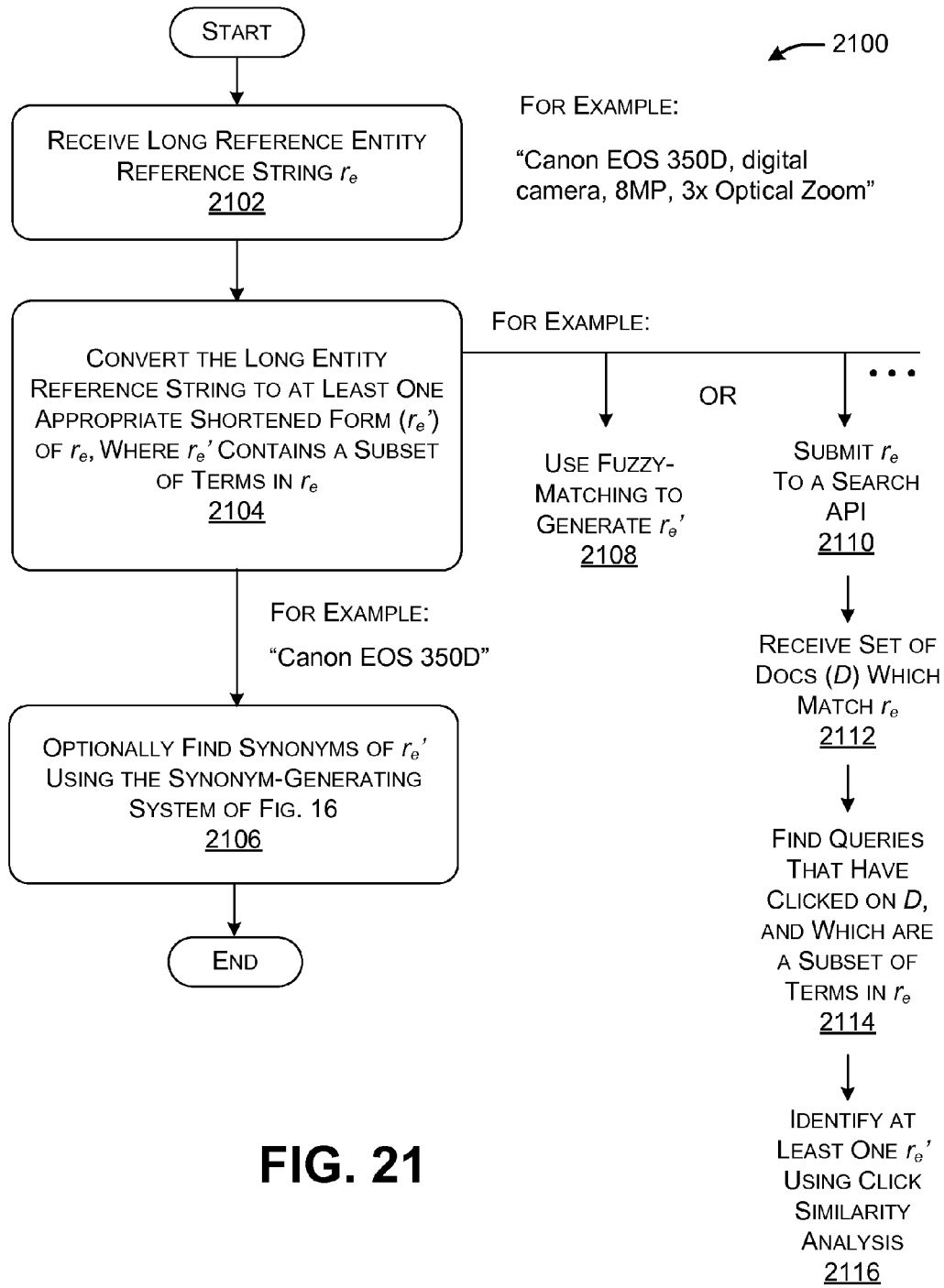
FIG. 21 is a flowchart that shows one manner of operation of the reduction modules of FIGS. 19 and 20.

FIG. 21 shows a procedure 2100 that summarizes one manner of operation of the reduction modules (1902, 2002) of FIGS. 19 and 20. In block 202, the reduction modules (1902, 2002) receive a long entity reference string $r_e$. In block 2104, the reduction modules (1902, 2002) convert the long $r_e$ into at least one shortened counterpart, $r_e'$, if possible. The $r_e'$ includes a subset of terms in $r_e$. In block 2106, the similarity analysis framework 1600 of FIG. 16 optionally finds valid synonyms of $r_e'$.

The two branches that emanate from block 2104 correspond to analyses performed by the reduction module 1902 of FIG. 19, and the reduction module 2002 of FIG. 20. In one case, the similarity analysis framework 1600 performs one of these branches. In another case, the similarity analysis framework 1600 applies the processing in the second branch (which leverages the use of the search API 2004), only if the processing in the first branch (which uses a fuzz-matching technique) cannot successfully generate a shortened version of $r_e$.

More specifically, in block 2108, the reduction module 1902 uses a fuzzy-matching technique to generate $r_e'$ based on $r_e$.

In block 2110, the reduction module 2002 submits the long $r_e$ as a query to the query engine 2006. In block 2112, reduction module 2002 receives a list of documents D that match the query $r_e$. In block 2114, the reduction module 2002 finds queries that have resulted in selection of the documents in D, where those queries also include terms which are subsets of the terms in $r_e$. This yields an initial set of queries for consideration. In block 2116, the reduction module 2002 identifies at least one shortened version of $r_e$ (if possible), i.e., $r_e'$, by performing click similarity analysis with respect to the candidates in the initial set of queries.

F. Illustrative Computing Functionality

Figure 22:
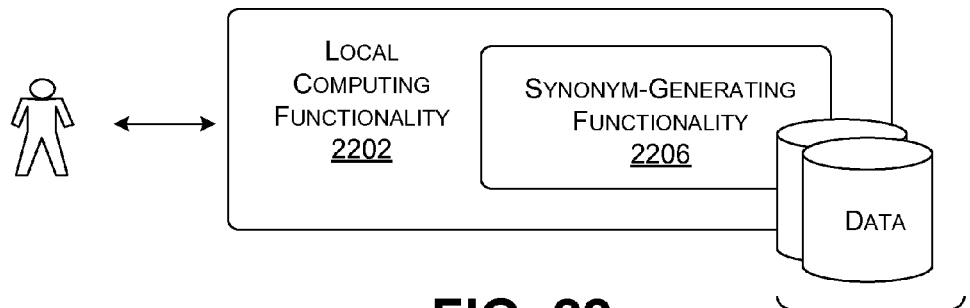
FIG. 22 shows a first computer-related implementation of the functionality shown in the foregoing drawings.

FIG. 22 shows a first physical implementation of the functionality shown in the foregoing drawings. In this case, all aspects of the similarity analysis framework 1600 described above are implemented by stand-alone local computing functionality 2202, in conjunction with one or more data stores 2204. FIG. 22 illustrates this point by indicating that the local computing functionality 2202 includes synonym-generating functionality 2206. To cite one example, the local computing functionality 2202 may maintain a local lookup engine, which provides access to local and/or remote resources. The lookup engine can use the synonym-generating functionality 2206 to facilitate a user's access to the resources.

The local computing functionality 2202 can correspond to any type of computing device, such as a personal computing device, a computer work station, a lap top computing device, a netbook-type computing device, a tablet computing device, a booklet computing device, a mobile telephone device, a personal digital assistant device, a game console device, a portable game device, a set-top box device, and so on, or any combination thereof.

Figure 23:
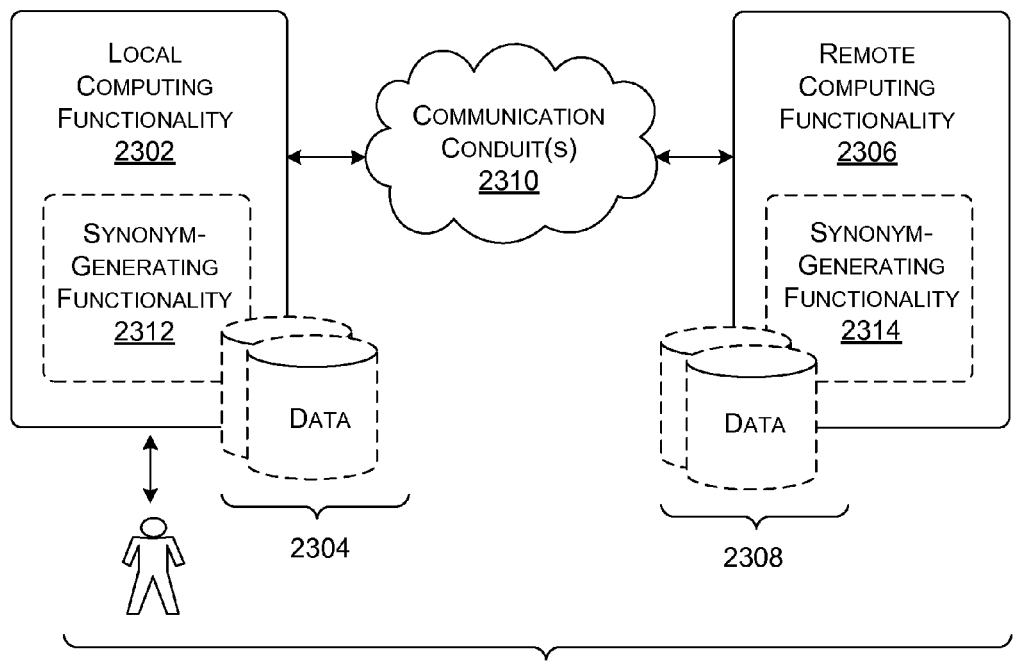
FIG. 23 shows a second computer-related implementation of the functionality shown in the foregoing drawings.

FIG. 23 shows a second physical implementation of the functionality shown in the foregoing drawings. In this case, local computing functionality 2302 (and associated data stores 2304) are coupled to the remote computing functionality 2306 (and associated data stores 2308) via a communication conduit 2310. Here, any aspect of the similarity analysis framework 1600 can be distributed between the local and remote computing functionalities (2302, 2306) in any manner. FIG. 23 conveys this point by showing some synonym generating functionality 2312 provided by the local computing functionality 2302 and some synonym-generating functionality 2314 provided by the remote computing functionality 2306.

In one case, all of the processing performed by the similarity analysis framework 1600 can be implemented by the remote computing functionality 2306. For example, the remote computing functionality 2306 can generate synonyms and then load these synonyms into a remote search engine (not shown), the local computing functionality 2302, or any other functionality. These synonyms can then facilitate the mapping of a user's retrieval request to the resources being sought by the user. The user, for example, may use the local computing functionality 2302 to submit queries to a remote search engine (not shown).

The local computing functionality 2302 of FIG. 23 can be implemented using any of the computing devices mentioned above with respect to FIG. 22. The remote computing functionality 2306 can be implemented by one or more server computing devices. The communication conduit 2310 can be implemented by a local area network, a wide area network (e.g., the Internet), or combination thereof.

Figure 24:
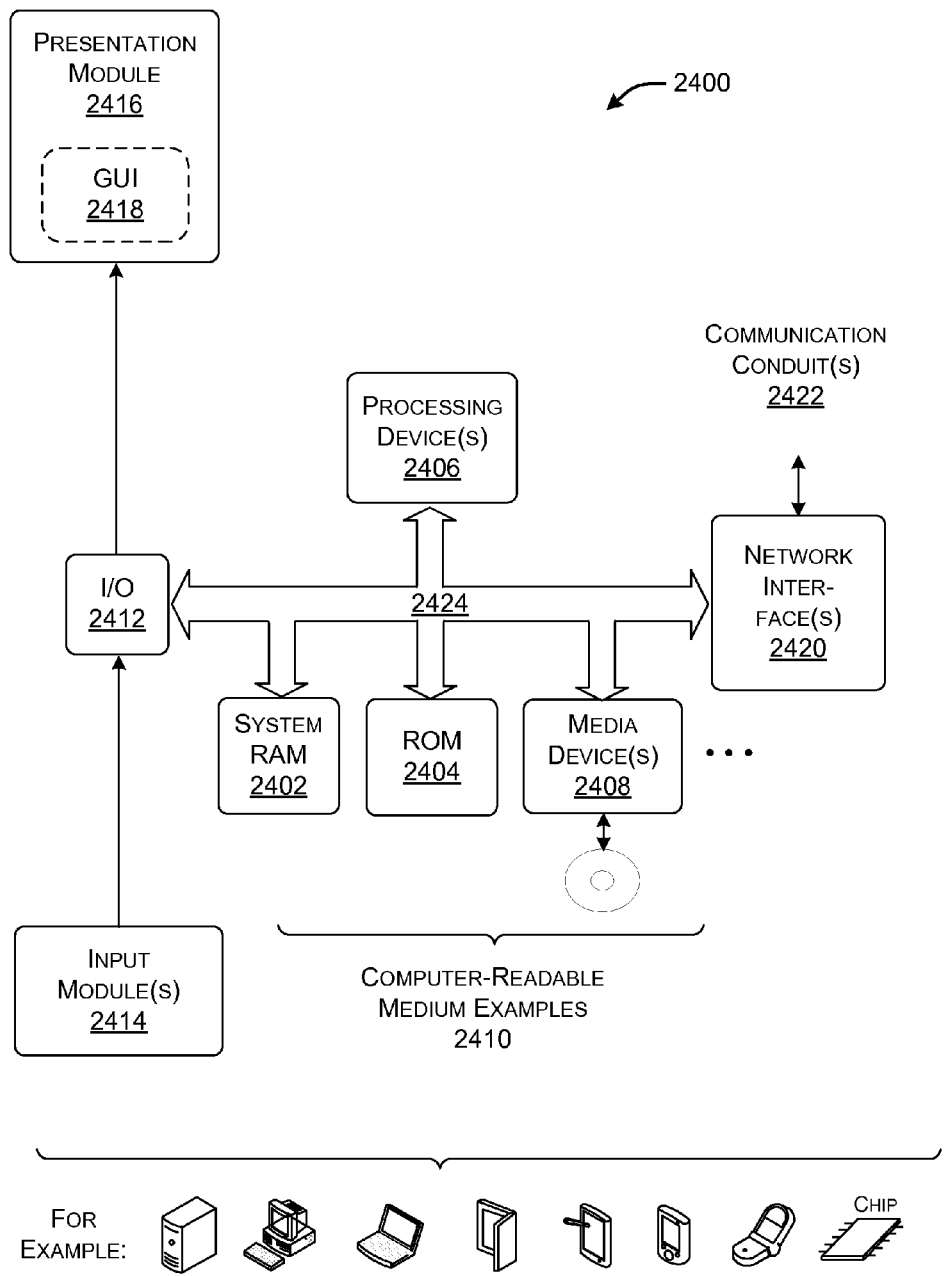
FIG. 24 shows a yet more detailed computer-related implementation of the functionality shown in the foregoing drawings.

FIG. 24 sets forth a yet more detailed depiction of computing functionality 2400 that can be used to implement any aspect of the functions described above. For example, the computing functionality 2400 can be used to implement any aspect of the similarity analysis framework 1600 of FIG. 16, e.g., as provided by the embodiment of FIG. 22, the embodiment of FIG. 23, or any other embodiment. In all cases, the computing functionality 2400 represents one or more physical and tangible processing mechanisms.

The computing functionality 2400 can include volatile and non-volatile memory, such as RAM 2402 and ROM 2404, as well as one or more processing devices 2406 (e.g., one or more CPUs, and/or one or more GPUs, etc.). The computing functionality 2400 also optionally includes various media devices 2408, such as a hard disk module, an optical disk module, and so forth. The computing functionality 2400 can perform various operations identified above when the processing device(s) 2406 executes instructions that are maintained by memory (e.g., RAM 2402, ROM 2404, or elsewhere).

More generally, instructions and other information can be stored on any computer readable medium 2410, including, but not limited to, static memory storage devices, magnetic storage devices, optical storage devices, and so on. The term computer readable medium also encompasses plural storage devices. In all cases, the computer readable medium 2410 represents some form of physical and tangible entity.

The computing functionality 2400 also includes an input/output module 2412 for receiving various inputs (via input modules 2414), and for providing various outputs (via output modules). One particular output mechanism may include a presentation module 2416 and an associated graphical user interface (GUI) 2418. The computing functionality 2400 can also include one or more network interfaces 2420 for exchanging data with other devices via one or more communication conduits 2422. One or more communication buses 2424 communicatively couple the above-described components together.

The communication conduit(s) 2422 can be implemented in any manner, e.g., by a local area network, a wide area network (e.g., the Internet), etc., or any combination thereof. The communication conduit(s) 2422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computer processors, comprising:
   providing an entity reference string $r_e$ that is associated with an entity;
   providing a set of candidate strings $S_e$, comprising at least one candidate string $s_e$;
   generating, using query log data, similarity score information for respective pairs of individual candidate strings of the set of candidate strings $S_e$ and the entity reference string $r_e$ using at least two similarity analysis functions; and
   determining, using the similarity score information, whether the individual candidate strings are valid synonyms of the entity reference string $r_e$, where a valid synonym refers to the entity and satisfies a core set of synonym-related properties jointly provided by said at least two similarity analysis functions.

2. A computer-implemented system comprising:
   a similarity analysis framework including at least two similarity analysis modules and a filtering module, wherein:
      the similarity analysis framework is configured to provide an entity reference string that is associated with an entity and provide a set of candidate strings,
      the at least two similarity analysis modules are configured to generate, using query log data, similarity score information for respective pairs of the entity reference string and individual candidate strings of the set of candidate strings, and
      the filtering module is configured to determine, using the similarity score information, whether the individual candidate strings are valid synonyms of the entity reference string, where a valid synonym refers to the entity and satisfies a core set of synonym-related properties jointly provided by said at least two similarity analysis modules; and
   a processor that executes computer-executable instructions associated with the similarity analysis framework.

3. Computer readable storage media storing computer readable instructions that, when executed by one or more processing devices, cause the one or more processing devices to perform acts comprising:
   providing an entity reference string that is associated with an entity;
   providing a set of candidate strings;
   generating, using query log data, similarity score information for respective pairs of the entity reference string and individual candidate strings of the set of candidate strings using at least two similarity analysis functions; and
   determining, using the similarity score information, whether the individual candidate strings are valid synonyms of the entity reference string, where a valid synonym refers to the entity and satisfies a core set of synonym-related properties jointly provided by said at least two similarity analysis functions.

4. The method of claim 1, wherein a first subset of the synonym-related properties satisfied by a first similarity analysis function of the at least two similarity analysis functions differs from a second subset of synonym-related properties satisfied by a second similarity analysis function of the at least two similarity analysis functions.

5. The method of claim 1, wherein at least one synonym-related property in the core set of synonym-related properties is a symmetry property, wherein a pair $(r_e, s_e)$ satisfies the symmetry property when both the at least one candidate string $s_e$ is considered similar to the entity reference string $r_e$, and the entity reference string $r_e$ is considered similar to the at least one candidate string $s_e$.

6. The method of claim 1, wherein at least one synonym-related property in the core set of synonym-related properties is a strength-of-similarity property, wherein a pair $(r_e, s_e)$ satisfies the strength-of-similarity property when a strength of similarity between the entity reference string $r_e$ and the at least one candidate string $s_e$ exceeds a prescribed strength-related threshold.

7. The method of claim 1, wherein at least one synonym-related property in the core set of synonym-related properties is a relatedness-of-class property, wherein a pair $(r_e, s_e)$ satisfies the relatedness-of-class property when the entity reference string $r_e$ and the at least one candidate string $s_e$ correspond to a same class of strings.

8. The method of claim 1, further comprising generating the set of candidate strings $S_e$ by:
   determining, using the query log data, a set of documents D that have been selected in response to submitting the entity reference string $r_e$ as a query; and
   determining, using the query log data, a set of queries that have been submitted and which have resulted in selection of at least one document in the set of documents D, the set of queries comprising the set of candidate strings $S_e$.

9. The method of claim 1, further comprising converting the entity reference string $r_e$ to a shorter entity reference string $r_e'$, wherein the shorter entity reference string $r_e'$ contains a subset of terms found in the entity reference string $r_e$.

10. The system of claim 2, wherein the similarity analysis framework is further configured to generate the set of candidate strings by:
    determining, using the query log data, a set of documents that have been selected in response to submitting the entity reference string as a query; and
    determining, using the query log data, a set of queries that have been submitted and which have resulted in selection of at least one document in the set of documents, the set of queries comprising the set of candidate strings.

11. The method of claim 8, wherein said generating the similarity score information comprises generating a first pseudo-document similarity score $Score_{pdsim}(s_e \rightarrow r_e)$ for the individual candidate strings which describes a strength of relatedness of the individual candidate strings to the entity reference string $r_e$, and a second pseudo-document similarity score $Score_{pdsim}(r_e \rightarrow s_e)$ for the individual candidate strings which describes a strength of relatedness of the entity reference string $r_e$ to the individual candidate strings.

12. The method of claim 8, wherein said generating comprises generating a query context similarity score $Score_{qcsim}$ for the individual candidate strings by:
    receiving context information for the entity reference string $r_e$, the context information for the entity reference string $r_e$ identifying words used in conjunction with the entity reference string $r_e$ when the entity reference string $r_e$ has been submitted as the query;

receiving context information for the individual candidate strings, the context information for the individual candidate strings identifying words used in conjunction with the individual candidate strings when the individual candidate strings have been submitted as other queries; and generating the query context similarity score $Score_{qcsim}$ for the individual candidate strings using the context information for the entity reference string $r_e$ and the context information for the individual candidate strings.

13. The method of claim 9, wherein said converting comprises using a fuzzy-matching reduction function to generate the shorter entity reference string $r_e'$ from the entity reference string $r_e$.

14. The method of claim 9, wherein said converting comprises:

submitting the entity reference string $r_e$ to a search engine;

receiving a set of documents D which match the entity reference string $r_e$;

finding an initial set of queries, using the query log data, that have resulted in selection of individual documents in the set of documents D, wherein individual queries of the initial set of queries include the subset of terms found in the entity reference string $r_e$; and using similarity analysis to find at least one query in the initial set of queries that is sufficiently related to the entity reference string $r_e$, providing that said at least one query can be found, said at least one query corresponding to the shorter entity reference string $r_e'$.

15. The system of claim 10, the at least two similarity analysis modules further configured to generate the similarity score information by generating a first pseudo-document similarity score for the individual candidate strings which describes a strength of relatedness of the individual candidate strings to the entity reference string, and a second pseudo-document similarity score for the individual candidate strings which describes a strength of relatedness of the entity reference string to the individual candidate strings.

16. The method of claim 11, wherein said generating the first pseudo-document similarity score $Score_{pdsim}(s_e \rightarrow r_e)$ for the individual candidate strings comprises:

receiving a set of pseudo-documents PD, individual pseudo-documents pdoc in the set of pseudo-documents PD corresponding to a document d in the set of documents D, and individual pseudo-documents pdoc containing a set of terms found in queries that have been submitted and which have resulted in the selection of the document d;

determining, for the individual candidate strings, a number of the individual pseudo-documents pdoc that contain all of the terms in the individual candidate strings; and generating the first pseudo-document similarity score $Score_{pdsim}(s_e \rightarrow r_e)$ for the individual candidate strings using said number.

17. The system of claim 15, wherein said generating the first pseudo-document similarity score for the individual candidate strings comprises:

receiving a set of pseudo-documents, an individual pseudo-document in the set of pseudo-documents corresponding to a respective document in the set of documents, and the individual pseudo-document containing a set of terms found in queries that have been submitted and which have resulted in the selection of the respective document;

determining, for the individual candidate strings, a number of pseudo-documents that contain all of the terms of the set in the individual candidate strings; and generating the first pseudo-document similarity score for the individual candidate strings using said number.

18. The method of claim 16, wherein said determining the number of the individual pseudo-documents pdoc comprises:

generating a PD inverted index that relates the individual pseudo-documents pdoc to terms found in the set of candidate strings $S_e$;

generating a $s_e$ inverted index that relates the individual candidate strings to terms found in the set of candidate strings $S_e$;

generating a CD matrix that identifies, for individual pairs of a particular pseudo-document pdoc and a particular candidate string $s_e$, a number of terms in the particular candidate string $s_e$ that are found in the particular pseudo-document pdoc; and determining the number of the individual pseudo-documents pdoc using the CD matrix.

19. The method of claim 16, wherein said determining the number of the individual pseudo-documents pdoc is performed in a distributed manner using a plurality of computational nodes.

20. The system of claim 17, wherein said determining the number of pseudo-documents comprises:

generating an inverted index that relates pseudo-documents to terms found in the set of candidate strings;

generating another inverted index that relates candidate strings to terms found in the set of candidate strings;

generating a matrix that identifies, for individual pairs of a particular pseudo-document and a particular candidate string, a number of terms in the particular candidate string that are found in the particular pseudo-document; and determining the number of pseudo-documents using the matrix.

* * * * *